US012319071B2

(12) United States Patent
Onishi

(10) Patent No.: US 12,319,071 B2
(45) Date of Patent: Jun. 3, 2025

(54) HEAD REPLACEMENT METHOD, INKJET PRINTING APPARATUS, AND NON-TRANSITORY COMPUTER-READABLE RECORDING MEDIUM RECORDING HEAD REPLACEMENT SUPPORT PROGRAM

(71) Applicant: SCREEN HOLDINGS CO., LTD., Kyoto (JP)

(72) Inventor: Hideaki Onishi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 170 days.

(21) Appl. No.: 18/452,859

(22) Filed: Aug. 21, 2023

(65) Prior Publication Data

US 2024/0092101 A1 Mar. 21, 2024

(30) Foreign Application Priority Data

Sep. 15, 2022 (JP) ................................ 2022-147034

(51) Int. Cl.

| | |
|---|---|
| ***B41J 25/34*** | (2006.01) |
| ***B41J 2/175*** | (2006.01) |
| ***B41J 2/18*** | (2006.01) |
| ***B41J 2/185*** | (2006.01) |

(52) U.S. Cl.

CPC ............... *B41J 25/34* (2013.01); *B41J 2/175* (2013.01); *B41J 2/1752* (2013.01); *B41J 2/17543* (2013.01); *B41J 2/17566* (2013.01); *B41J 2/18* (2013.01); *B41J 2/185* (2013.01)

(58) Field of Classification Search

CPC . B41J 25/34; B41J 2/175; B41J 2/1752; B41J 2/17543; B41J 2/17566; B41J 2/18; B41J 2/185

See application file for complete search history.

(56) References Cited

U.S. PATENT DOCUMENTS

| | | | |
|---|---|---|---|
| 5,943,078 A | | 8/1999 | Nishimoto et al. |
| 8,430,470 B2 | | 4/2013 | Murase et al. |
| 11,007,786 B2 * | | 5/2021 | Tokisawa ............ B41J 2/16517 |
| 11,667,129 B2 * | | 6/2023 | Olgac ...................... B41J 2/175 347/94 |
| 2011/0025763 A1 | | 2/2011 | Rosati et al. |
| 2019/0070861 A1 | | 3/2019 | Regensburger et al. |
| 2019/0389225 A1 * | | 12/2019 | Yamazaki ............... B41J 2/185 |

FOREIGN PATENT DOCUMENTS

JP 2005-297279 A 10/2005

* cited by examiner

*Primary Examiner* — Henok D Legesse

(74) *Attorney, Agent, or Firm* — Rimon P.C.

(57) ABSTRACT

The head replacement method includes: a pipe connection step of performing, by a user, pipe connection of a new head; an ink circulation start step of starting circulation of ink in a circulation flow path; and a connection state determination step of determined, based on an ink liquid level position representing a height of an ink liquid level in at least one of a collection tank and a supply tank, whether a pipe connection, including a connection between an ink discharge pipe and a collection branch pipe and a connection between an ink inflow pipe and a supply branch pipe, is properly made.

15 Claims, 23 Drawing Sheets

HEAD REPLACEMENT METHOD, INKJET PRINTING APPARATUS, AND NON-TRANSITORY COMPUTER-READABLE RECORDING MEDIUM RECORDING HEAD REPLACEMENT SUPPORT PROGRAM

BACKGROUND OF THE INVENTION

Field of the Invention

The present invention relates to an inkjet printing apparatus, and more particularly to a head replacement method in the inkjet printing apparatus.

Description of Related Art

Conventionally, there is known an inkjet printing apparatus that ejects ink onto a printing medium (base material) such as printing paper by heat or pressure to print on a printing medium. The inkjet printing apparatus includes a head unit including a plurality of heads (print heads) having many nozzles that eject ink. The plurality of heads constituting the head unit are held on one head holding plate. One head unit includes, for example, five heads. In this case, the five heads are held on one head holding plate.

A typical inkjet printing apparatus for color printing is provided with at least a head unit for cyan (C) color, a head unit for magenta (M) color, a head unit for yellow (Y) color, and a head unit for black (K) color. In this manner, the head unit is typically provided for each color. An ink supply mechanism (ink circulation system) for supplying ink to each of the plurality of heads constituting the head unit is provided for each color. The ink supply mechanism is provided with a supply tank that stores ink to be supplied to the head and a collection tank that stores ink collected from the head. Ink flows from the supply tank to the collection tank via the head according to a difference (differential pressure) between the air pressure in the supply tank and the air pressure in the collection tank. Note that the present description focuses on an inkjet printing apparatus where pipes constituting the ink supply mechanism and pipes in the head form a circulation flow path through which ink circulates. When printing is performed on a printing medium, the ink circulates through the circulation flow path.

With respect to the inkjet printing apparatus as described above, ink ejection failure may occur due to solidification (drying) of ink caused by non-use for a long period of time, or other reasons. When printing is performed in a state where ink ejection failure has occurred, high-quality printed matter cannot be obtained. Therefore, cleaning or flushing is performed as a countermeasure against ink ejection failure. However, even when cleaning or flushing is performed, ink ejection failure may not be resolved sufficiently. In such a case, the head in which the ink ejection failure occurs is replaced. The head may be replaced for reasons except for ink ejection failure. Typically, a new head unit is provided by a printing apparatus manufacturer or the like with its interior filled with a liquid such as a cleaning solution.

Head replacement is usually manually performed by a user of the inkjet printing apparatus. That is, head replacement is not performed by a manufacturer operator who is familiar with the structure and the like of the inkjet printing apparatus. For this reason, during head replacement, the connection between the pipe constituting the ink supply mechanism and the pipe in the head (hereinafter simply referred to as "pipe connection") may not be made properly. In the following description, with respect to the pipe connection, the connection between the pipe for supplying the ink from the supply tank to the head and the pipe in the head is referred to as a "supply-side pipe connection", and the connection between the pipe for collecting the ink from the head to the collection tank and the pipe in the head is referred to as a "collection-side pipe connection".

After head replacement, the air pressure in the supply tank is set to a high positive pressure, whereby the cleaning solution in the head after replacement (new head) is naturally discharged to the head cleaning cap. However, when there is an abnormality in the supply-side pipe connection after head replacement, the cleaning solution is not discharged to the head cleaning cap, and the cleaning solution is mixed with the ink when the ink circulation in the circulation flow path is resumed. As a result, printing failure occurs, and the need to remove ink in the circulation flow path arises. Furthermore, when there is an abnormality in the collection-side pipe connection after head replacement, negative pressure is not suitably applied to the head when the ink circulation in the circulation flow path is resumed, and a meniscus is not normally formed in each nozzle. As a result, when printing is performed, ink unexpectedly falls from each nozzle onto the printing medium, so-called "ink spillage".

Japanese Laid-Open Patent Publication No. 2005-297279 discloses a technique for preventing damage to a head due to a pipe connection abnormality (failure). According to this technique, the head is provided with an inspection unit that inspects whether print data in a data latch unit is being updated normally or not. Then, when the inspection unit detects that the update of the print data has stopped, the printing operation stops, and an error signal is outputted.

However, according to the technique disclosed in Japanese Laid-Open Patent Publication No. 2005-297279, an abnormality in the pipe connection cannot be detected unless printing is actually performed on a printing medium after head replacement. Therefore, when there is an abnormality in the pipe connection, the printing medium and the ink are wasted.

SUMMARY OF THE INVENTION

Therefore, an object of the present invention is to provide a head replacement method capable of detecting an abnormality in pipe connection without performing printing, regarding an inkjet printing apparatus.

One aspect of the present invention is directed to a head replacement method for replacing a replacement target head that is at least one of a plurality of heads in an inkjet printing apparatus including the plurality of heads each configured to eject ink toward a printing medium, a head holding plate configured to hold the plurality of heads, and an ink supply mechanism configured to supply ink to each of the plurality of heads, the ink supply mechanism including a supply tank configured to store ink to be supplied to each of the plurality of heads, a collection tank configured to store ink collected from each of the plurality of heads, a supply pipe forming a flow path for ink supplied from the supply tank to each of the plurality of heads, a collection pipe forming a flow path for ink collected from each of the plurality of heads to the collection tank, a recirculation pipe configured to recirculate ink from the collection tank to the supply tank, a supply branch pipe forming a flow path for ink flowing from the supply pipe to each of the plurality of heads, and a collection branch pipe forming a flow path for ink flowing from each of the plurality of heads to the collection pipe, each of the plurality of heads including an ink discharge pipe, a first connector for connecting the ink discharge pipe and the collection branch pipe;

an ink inflow pipe, and a second connector for connecting the ink inflow pipe and the supply branch pipe, the supply tank, the supply pipe, the supply branch pipe, the ink inflow pipe, the ink discharge pipe, the collection branch pipe, the collection pipe, the collection tank, and the recirculation pipe forming a circulation flow path through which ink circulates, the head replacement method including:

a pipe removal step of removing the ink inflow pipe included in the replacement target head from the supply branch pipe and removing the ink discharge pipe included in the replacement target head from the collection branch pipe;

a head removal step of removing the replacement target head from the head holding plate;

a head attachment step of attaching a new head to be used as a replacement of the replacement target head to the head holding plate;

a pipe connection step of connecting the ink discharge pipe included in the new head to the collection branch pipe via the first connector and connecting the ink inflow pipe included in the new head to the supply branch pipe via the second connector;

an ink circulation start step of starting circulation of ink in the circulation flow path after the head attachment step and the pipe connection step; and a connection state determination step of determining, after the ink circulation start step, based on an ink liquid level position representing a height of an ink liquid level in at least one of the collection tank and the supply tank, whether a pipe connection, including a connection between the ink discharge pipe and the collection branch pipe via the first connector and a connection between the ink inflow pipe and the supply branch pipe via the second connector, is properly made in the pipe connection step.

With such a configuration, after the end of the replacement of the head by the user, it is determined whether the pipe connection, including the connection between the ink discharge pipe and the collection branch pipe and the connection between the ink inflow pipe and the supply branch pipe, is properly made based on the ink liquid level position in at least one of the collection tank and the supply tank. Even when the ink circulation in the circulation flow path is started, when there is an abnormality in the pipe connection, the ink liquid level position does not change, so that it is possible to detect an abnormality in the pipe connection without performing printing on the printing medium. As above, it is possible to provide a head replacement method capable of detecting an abnormality in pipe connection without performing printing, regarding an inkjet printing apparatus.

Another aspect of the present invention is directed to an inkjet printing apparatus including:

a plurality of heads each configured to eject ink toward a printing medium;

an ink supply mechanism configured to supply ink to each of the plurality of heads; and a controller configured to control operations of the plurality of heads and the ink supply mechanism, wherein the ink supply mechanism includes a supply tank configured to store ink to be supplied to each of the plurality of heads, a collection tank configured to store ink collected from each of the plurality of heads, a supply pipe forming a flow path for ink supplied from the supply tank to each of the plurality of heads, a collection pipe forming a flow path for ink collected from each of the plurality of heads to the collection tank, a recirculation pipe configured to recirculate ink from the collection tank to the supply tank, a supply branch pipe forming a flow path for ink flowing from the supply pipe to each of the plurality of heads, and a collection branch pipe forming a flow path for ink flowing from each of the plurality of heads to the collection pipe, each of the plurality of heads includes an ink discharge pipe, a first connector for connecting the ink discharge pipe and the collection branch pipe;

an ink inflow pipe, and a second connector for connecting the ink inflow pipe and the supply branch pipe, the supply tank, the supply pipe, the supply branch pipe, the ink inflow pipe, the ink discharge pipe, the collection branch pipe, the collection pipe, the collection tank, and the recirculation pipe form a circulation flow path through which ink circulates, and the controller execute, in order stated below, a message output step of outputting a message prompting replacement of a head, a replacement completion reception step of receiving an input indicating that the replacement of the head is completed, an ink circulation start step of starting circulation of ink in the circulation flow path to cause ink to be supplied to a new head that is a head after replacement, and a connection state determination step of determining, based on an ink liquid level position representing a height of an ink liquid level in at least one of the collection tank and the supply tank, whether a pipe connection, including a connection between the ink discharge pipe included in the new head and the collection branch pipe via the first connector and a connection between the ink inflow pipe included in the new head and the supply branch pipe via the second connector, is properly made.

Still another aspect of the present invention is directed to a non-transitory computer-readable recording medium on which a head replacement support program is recorded, the head replacement support program causing a computer included in a controller to execute, in an inkjet printing apparatus including a plurality of heads each configured to eject ink toward a printing medium, an ink supply mechanism configured to supply ink to each of the plurality of heads, and the controller configured to control operations of the plurality of heads and the ink supply mechanism:

a message output step of outputting a message prompting replacement of a head;

a replacement completion reception step of receiving an input indicating that the replacement of the head is completed; and a replacement work result inspection step of inspecting whether replacement of the head is properly made, wherein the ink supply mechanism includes a supply tank configured to store ink to be supplied to each of the plurality of heads, a collection tank configured to store ink collected from each of the plurality of heads, a supply pipe forming a flow path for ink supplied from the supply tank to each of the plurality of heads, a collection pipe forming a flow path for ink collected from each of the plurality of heads to the collection tank, a recirculation pipe configured to recirculate ink from the collection tank to the supply tank, a supply branch pipe forming a flow path for ink flowing from the supply pipe to each of the plurality of heads, and a collection branch pipe forming a flow path for ink flowing from each of the plurality of heads to the collection pipe, each of the plurality of heads includes an ink discharge pipe, a first connector for connecting the ink discharge pipe and the collection branch pipe;

an ink inflow pipe, and a second connector for connecting the ink inflow pipe and the supply branch pipe, the supply tank, the supply pipe, the supply branch pipe, the ink inflow pipe, the ink discharge pipe, the collection branch pipe, the collection pipe, the collection tank, and the recirculation pipe form a circulation flow path through which ink circulates, and the replacement work result inspection step includes an ink circulation start step of starting circulation of ink in the circulation flow path to cause ink to be supplied to a new head that is a head after replacement, and a connection state determination step of determining, based on an ink liquid level position representing a height of an ink liquid level in at least one of the collection tank and the supply tank, whether a pipe connection, including a connection between the ink discharge pipe included in the new head and the collection branch pipe via the first connector and a connection between the ink inflow pipe included in the new head and the supply branch pipe via the second connector, is properly made.

These and other objects, features, modes, and advantageous effects of the present invention will become more apparent from the following detailed description of the present invention with reference to the accompanying drawings.

DETAILED DESCRIPTION OF PREFERRED EMBODIMENT

An embodiment of the present invention will be described below with reference to the accompanying drawings.

1 Configuration of Inkjet Printing Apparatus

Figure 1:
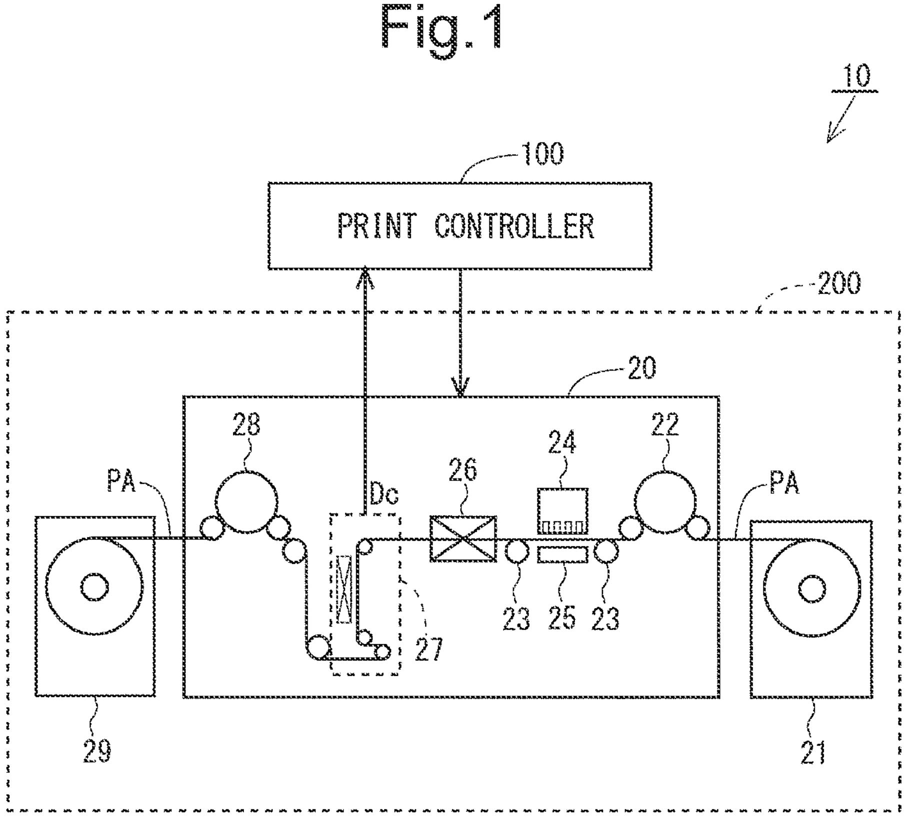
FIG. 1 is a schematic diagram showing a configuration example of an inkjet printing apparatus according to an embodiment of the present invention.

FIG. 1 is a schematic diagram showing a configuration example of an inkjet printing apparatus 10 according to one embodiment of the present invention; The inkjet printing apparatus 10 includes a print controller 100 and a printer body 200. The printer body 200 includes a paper feeding unit 21 that supplies printing paper (e.g., roll paper) PA, which is a printing medium, a printing mechanism 20 that performs printing on the printing paper PA, and a paper winding unit 29 that winds the printing paper PA after printing. The printing mechanism 20 includes a first drive roller 22 for conveying the printing paper PA to the inside, a plurality of support rollers 23 for conveying the printing paper PA inside the printing mechanism 20, a printing unit 24 that performs printing on the printing paper PA by ejecting ink, a cleaning mechanism 25 that cleans the printing unit 24, a drying unit 26 that dries the printing paper PA after printing, an imaging unit 27 for capturing a printed image (printing paper PA after printing) and checking whether the printed image is good or not and an ink ejecting state from a nozzle to be described later, and a second drive roller 28 for outputting the printing paper PA from the inside of the printing mechanism 20. Note that imaged data Dc obtained by the imaging unit 27 capturing the image of the printed image is sent to the print controller 100, and inspection using the imaged data Dc is performed.

The print controller 100 controls the operation of the printer body 200 having the configuration as above. When an instruction command for printing output is given to the print controller 100, the print controller 100 controls the operation of the printer body 200 so that the printing paper PA is conveyed from the paper feeding unit 21 to the paper winding unit 29. Then, first, the printing unit 24 performs printing on the printing paper PA, next, the drying unit 26 dries the printing paper PA, and finally, the imaging unit 27 captures a printed image. When necessary, the cleaning mechanism 25 cleans the printing unit 24.

Figure 2:
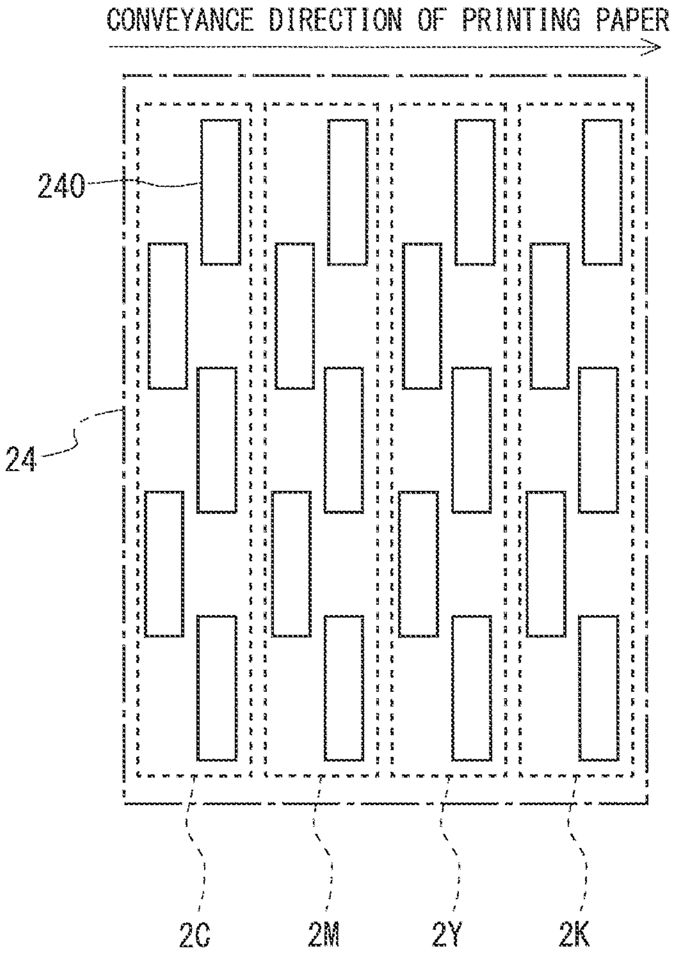
FIG. 2 is a plan view showing a configuration example of a printing unit in the embodiment.

FIG. 2 is a plan view showing a configuration example of the printing unit 24. As shown in FIG. 2, the printing unit 24 includes head units 2C, 2M, 2Y, and 2K of cyan color (C color), magenta color (M color), yellow color (Y color), and black color (K color) arranged in a row in the conveyance direction of the printing paper PA. Each head unit includes a plurality of (five in the present embodiment) heads (print heads) 240 arranged in a staggered manner. Each head 240 includes many nozzles that eject ink. Each nozzle of the head 240 included in the head unit 2C for C color ejects C-color ink, each nozzle of the head 240 included in the head unit 2M for M color ejects M-color ink, each nozzle of the head 240 included in the head unit 2Y for Y color ejects Y-color ink, and each nozzle of the head 240 included in the head unit 2K for K color ejects K-color ink.

2. Ink Supply Mechanism

Figure 3:
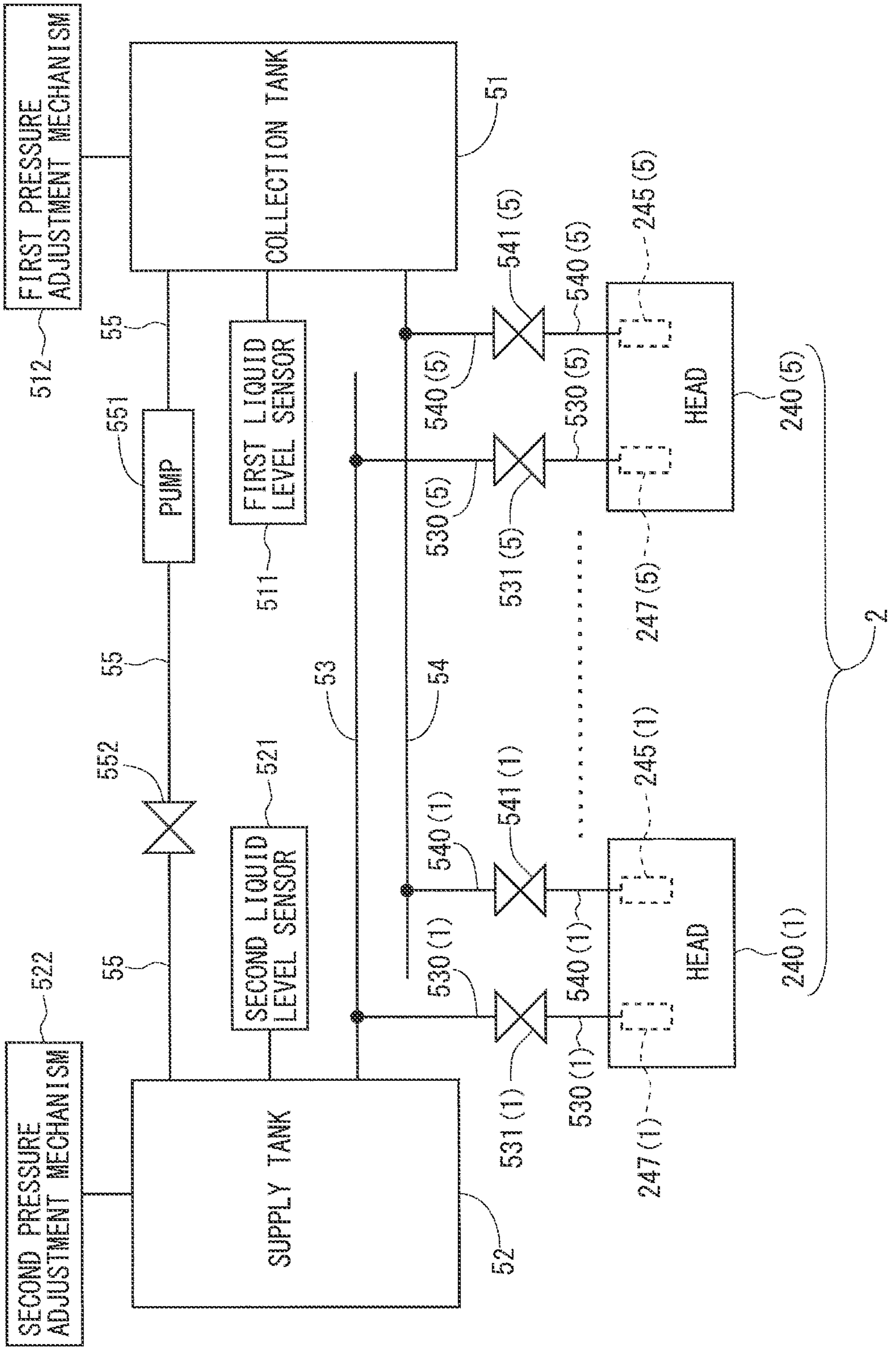
FIG. 3 is a schematic diagram showing a configuration of an ink supply mechanism corresponding to one head unit in the embodiment.

FIG. 3 is a schematic diagram showing a configuration of an ink supply mechanism corresponding to one head unit. The ink supply mechanism includes: a supply tank 52 for storing ink to be supplied to five heads 240(1) to 240(5); a collection tank 51 that stores ink collected from the five heads 240(1) to 240(5); a first pressure adjustment mechanism 512 that adjusts an air pressure in the collection tank 51; a second pressure adjustment mechanism 522 that adjusts an air pressure in the supply tank 52; a first liquid level sensor 511 that detects a first ink liquid level position representing a height of an ink liquid level in the collection tank 51; a second liquid level sensor 521 that detects a second ink liquid level position representing a height of an ink liquid level in the supply tank 52; a supply pipe (supply manifold) 53 that forms a flow path for ink to be supplied from the supply tank 52 to the five heads 240(1) to 240(5); a collection pipe (collection manifold) 54 that forms a flow path for ink collected from the five heads 240(1) to 240(5) to the collection tank 51; a recirculation pipe 55 for recirculating ink from the collection tank 51 to the supply tank 52; five supply branch pipes 530(1) to 530(5) that form flow patties for ink flowing from the supply pipe 53 to the five heads 240(1) to 240(5); five collection branch pipes 540(1) to 540(5) that form flow patties for ink flowing from the five heads 240(1) to 240(5) to the collection pipe 54; five supply control valves 531(1) to 531(5) provided corresponding to the five heads 240(1) to 240(5), respectively; five collection control valves 541(1) to 541(5) provided corresponding to the five heads 240(1) to 240(5), respectively; a pump 551 provided in the recirculation pipe 55; and a return control valve 552 provided in the recirculation pipe 55. Each supply control valve 531 controls the flow of ink in the corresponding supply branch pipe 530, each collection control valve 541 controls the flow of ink in the corresponding collection branch pipe 540, and the return control valve 552 controls the flow of ink in the recirculation pipe 55. The pump 551 feeds ink from the collection tank 51 toward the supply tank 52. Note that the supply control valve 531, the collection control valve 541, and the return control valve 552 are typically electromagnetic valves that control the flow of ink by turning on and off electricity.

In the above configuration, a circulation flow path is formed through which ink circulates in the order of "supply tank 52—supply pipe 53—supply branch pipe 531—head 240—collection branch pipe 541—collection pipe 54—collection tank 51—recirculation pipe 55—supply tank 52".

3. Configuration of Head

Figure 4:
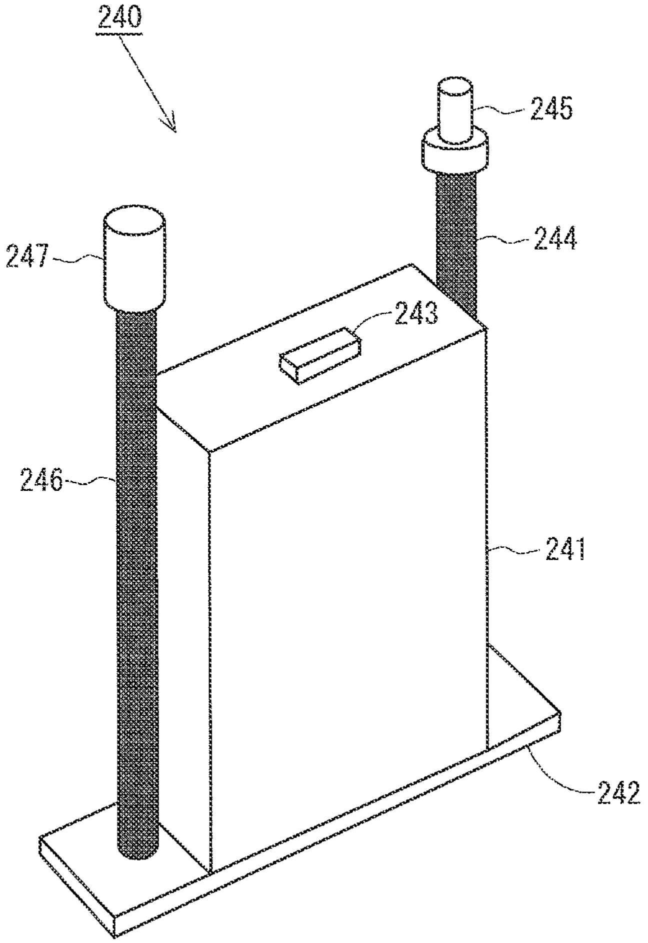
FIG. 4 is a perspective view schematically showing an appearance of a head (print head) in the embodiment.

FIG. 4 is a perspective view schematically showing the external appearance of the head (print head) 240. As shown in FIG. 4, the head 240 includes a body 241, a base plate 242, a communication connector 243 for connecting to a communication cable for a drive signal, an ink discharge pipe 244, a first non-spill 245 functioning as a connector for connecting the ink discharge pipe 244 to the collection branch pipe 540, an ink inflow pipe 246, and a second non-spill 247 functioning as a connector for connecting the ink inflow pipe 246 to the supply branch pipe 530. The ink discharge pipe 244 and the ink inflow pipe 246 are components forming the circulation flow path described above. Note that the first connector is achieved by the first non-spill 245, and the second connector is achieved by the second non-spill 247.

The body 241 includes an internal tank (not shown). The base plate 242 includes a flow path for ink flowing from the ink inflow pipe 246 to the internal tank and a flow path for ink flowing from the internal tank to the ink discharge pipe 244. The body 241 is also provided with many nozzles exposed to the back surface side of the base plate 242. A cavity in which ink is stored is provided between each nozzle and the internal tank, and a piezoelectric element is provided in the cavity. In such a configuration, when a drive signal having a predetermined drive waveform is applied to the piezoelectric element, the piezoelectric element is deformed based on the drive signal. As a result, ink is pushed out of the cavity, and ink is ejected from the nozzle.

Figure 5:
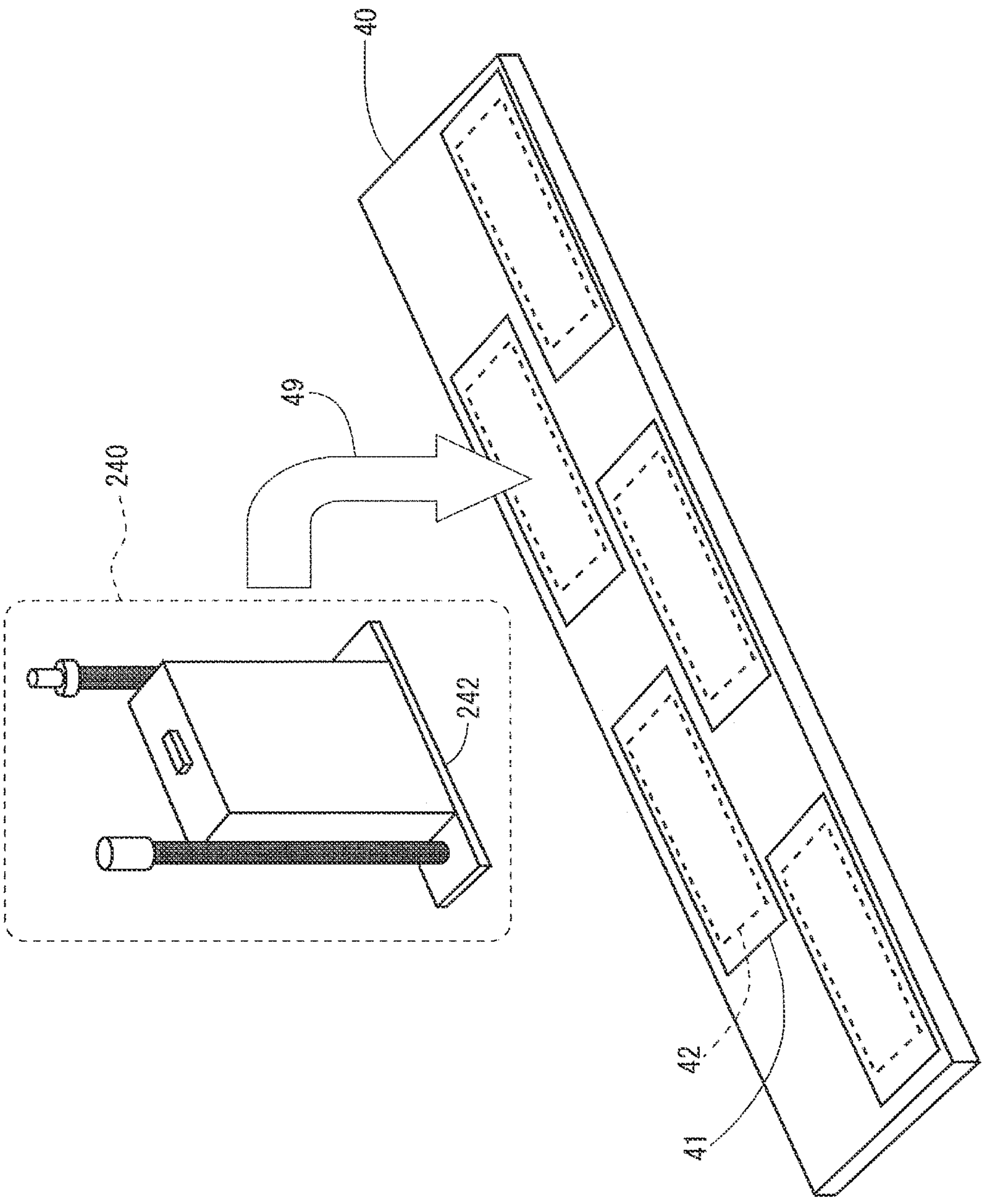
FIG. 5 is a view for explaining a head holding plate that holds a head in the embodiment.

FIG. 5 is a view for explaining the head holding plate 40 that holds the head 240. The head holding plate 40 is a plate-like member, and is provided with five head holding units 41 for holding the five heads 240 in the present embodiment. When the head 240 is attached to the head holding plate 40, the base plate 242 of the head 240 is placed at the position of the head holding unit 41 as indicated by the arrow denoted by reference numeral 49. A through hole 42 is formed in each head holding unit 41. With the through hole 42 being formed in the head holding unit 41 in this manner, when the head 240 is held by the head holding unit 41, many nozzles provided in the head 240 are exposed to the back surface side of the head holding plate 40. This enables ink to be ejected from the head 240 onto the printing paper PA.

4. Cleaning Mechanism

Figure 6:
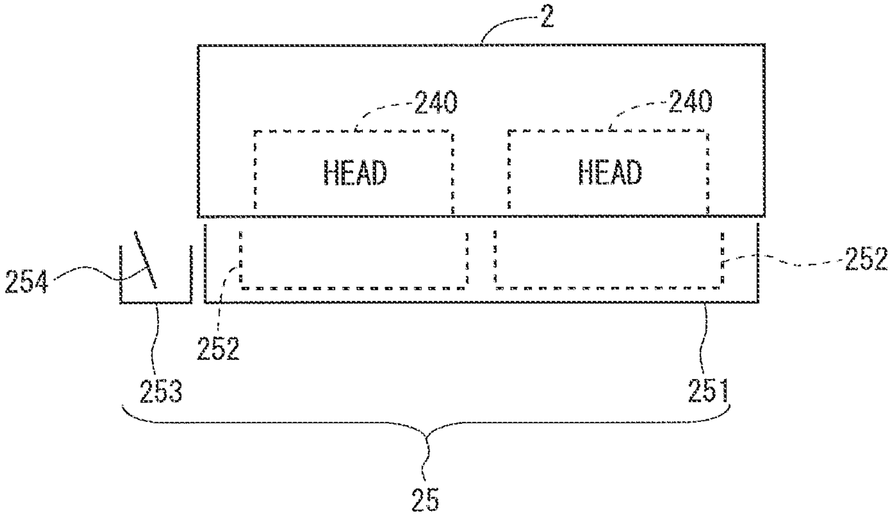
FIG. 6 is a diagram schematically showing a positional relationship between a head and a cleaning mechanism when the head is cleaned in the embodiment.
Figure 7:
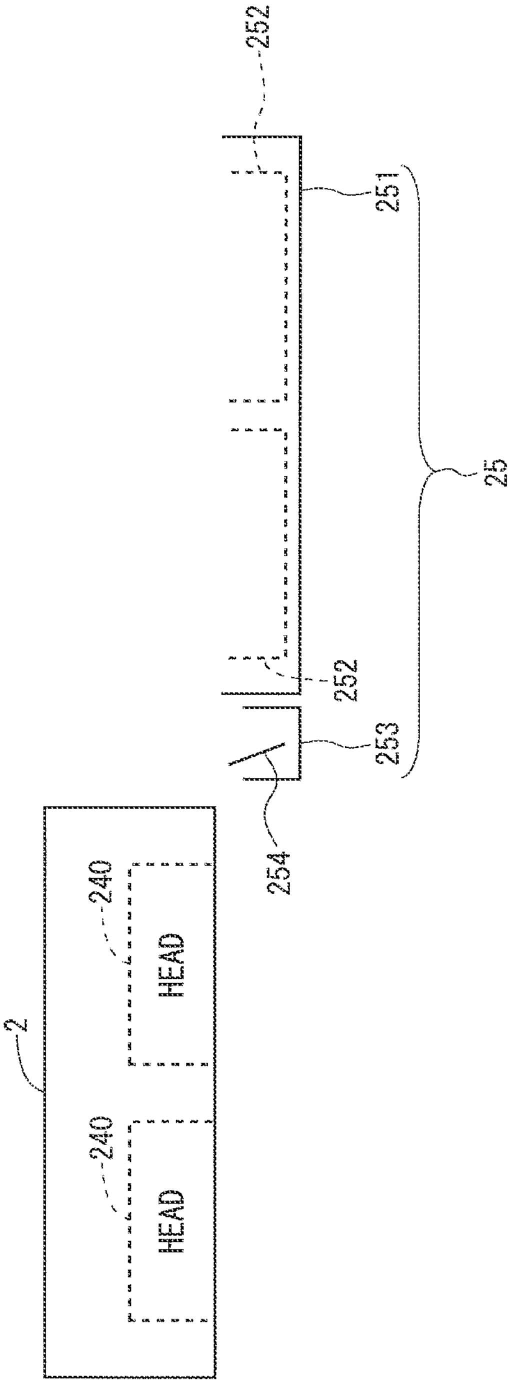
FIG. 7 is a diagram schematically showing a positional relationship between a head and a cleaning mechanism when printing is performed on printing paper in the embodiment.

The configuration and operation of the cleaning mechanism 25 will be described with reference to FIGS. 6 and 7. FIG. 6 is a diagram schematically showing a positional relationship between the head 240 and the cleaning mechanism 25 when the head 240 is cleaned, and FIG. 7 is a diagram schematically showing a positional relationship between the head 240 and the cleaning mechanism 25 when printing is performed on the printing paper PA. In the present embodiment, the position of the cleaning mechanism 25 can be moved under the control of the print controller 100. Hereinafter, for convenience, the position of the cleaning mechanism 25 when cleaning is performed (cf. FIG. 6) is referred to as a "home position", and the position of the cleaning mechanism 25 when printing is performed on the printing paper PA (cf. FIG. 7) is referred to as an "away position".

The cleaning mechanism 25 includes a cap unit 251 including a plurality of caps 252 and a wiper unit 253 including a wiper 254. When cleaning is performed, as shown in FIG. 6, each cap 252 covers the print surface of the corresponding head 240 to seal the print surface. In such a state, a purging process (pressurized purging) is performed to forcibly eject the ink remaining in the nozzle toward the cap 252 by increasing the air pressure of the inner tank in the head 240. When the cleaning ends, the cleaning mechanism 25 moves from the home position to the away position. When the cleaning mechanism 25 moves from the home position to the away position, a wiping process is performed in which the wiper 254 wipes off dirt on the printed surface of the head 240.

5. Configuration for Control 5.1 Hardware Configuration of Print Controller

Figure 8:
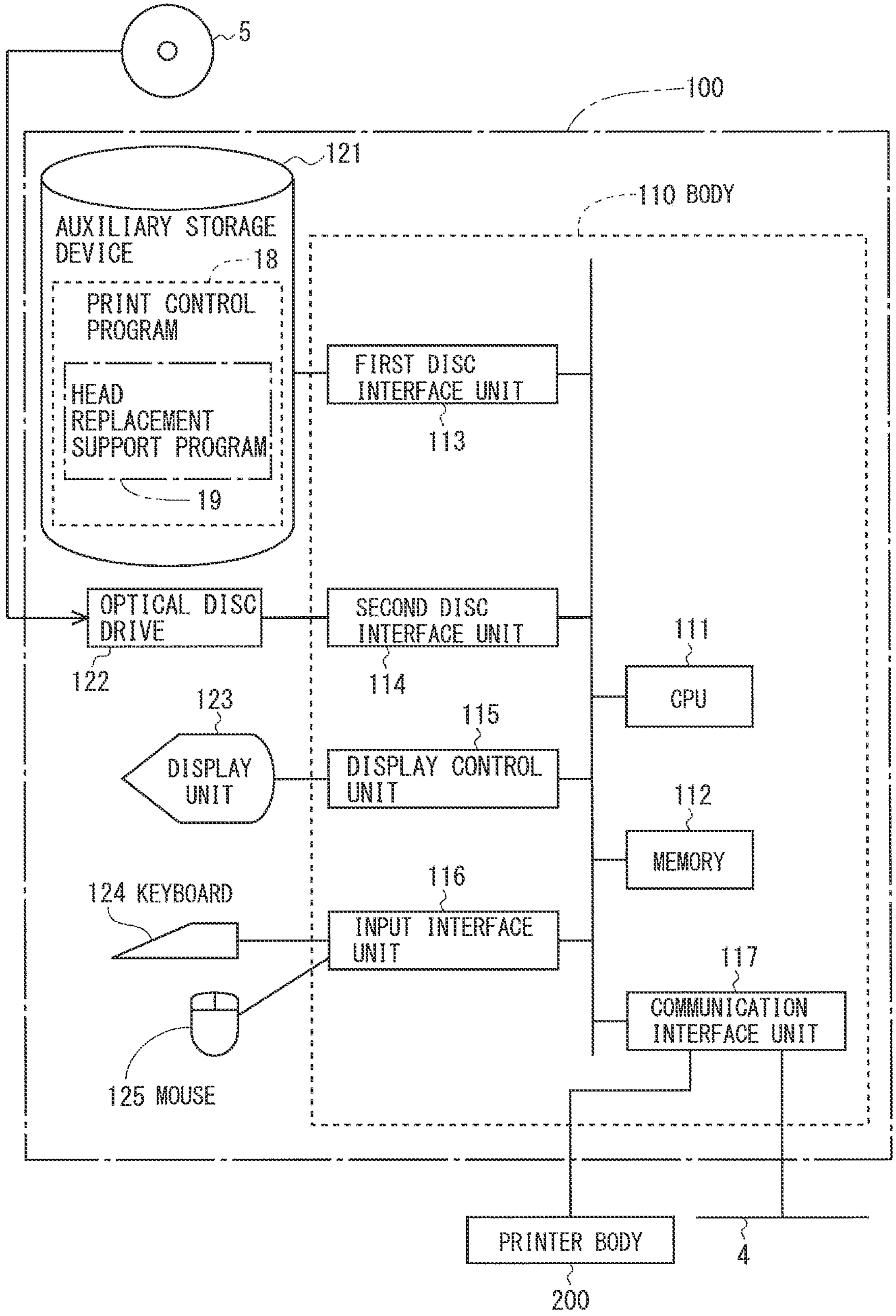
FIG. 8 is a block diagram showing a hardware configuration of a print controller according to the embodiment.

FIG. 8 is a block diagram showing the hardware configuration of the print controller 100. As shown in FIG. 8, the print controller 100 includes a body 110, an auxiliary storage device 121, an optical disc drive 122, a display unit 123, a keyboard 124, a mouse 125, and the like. The body 110 includes a central processing unit (CPU) 111, a memory 112, a first disc interface unit 113, a second disc interface unit 114, a display control unit 115, an input interface unit 116, and a communication interface unit 117. The CPU 111, the memory 112, the first disc interface unit 113, the second disc interface unit 114, the display control unit 115, the input interface unit 116, and the communication interface unit 117 are connected to each other through a system bus. The auxiliary storage device 121 is connected to the first disc interface unit 113. The optical disc drive 122 is connected to the second disc interface unit 114. The display unit (display device) 123 is connected to the display control unit 115. The keyboard 124 and the mouse 125 are connected to the input interface unit 116. The printer body 200 is connected to the communication interface unit 117 via a communication cable. The communication interface unit 117 is connected to the LAN 4. The auxiliary storage device 121 is a magnetic disc device or the like. An optical disc 5 as a computer-readable recording medium such as a compact disc read-only memory (CD-ROM) or a digital versatile disc (DVD)-ROM is inserted into the optical disc drive 122. The display unit 123 is a liquid crystal display or the like. The display unit 123 is used to display information desired by an operator. The keyboard 124 and the mouse 125 are used by the operator to input instructions to the print controller 100.

The auxiliary storage device 121 stores a print control program (a program for controlling the execution of a printing process by the printer body 200) 18. The print control program 18 includes, as a subprogram, a head replacement support program 19 for supporting the replacement of the head 240 by a user. The CPU 111 reads the print control program 18 stored in the auxiliary storage device 121 into the memory 112 and executes the program to achieve various functions of the print controller 100. The memory 112 includes a random-access memory (RAM) and a read-only memory (ROM). The memory 112 functions as a work area for the CPU 111 to execute the print control program 18 stored in the auxiliary storage device 121. Note that the print control program 18 is provided by being stored into the computer-readable recording medium (non-transitory recording medium). That is, for example, the user purchases the optical disc 5 as the recording medium of the print control program 18, inserts the optical disc 5 into the optical disc drive 122, reads the print control program 18 from the optical disc 5, and installs the print control program 18 in the auxiliary storage device 121.

5.2 Configuration Related to Control of Ink Supply Mechanism

Figure 9:
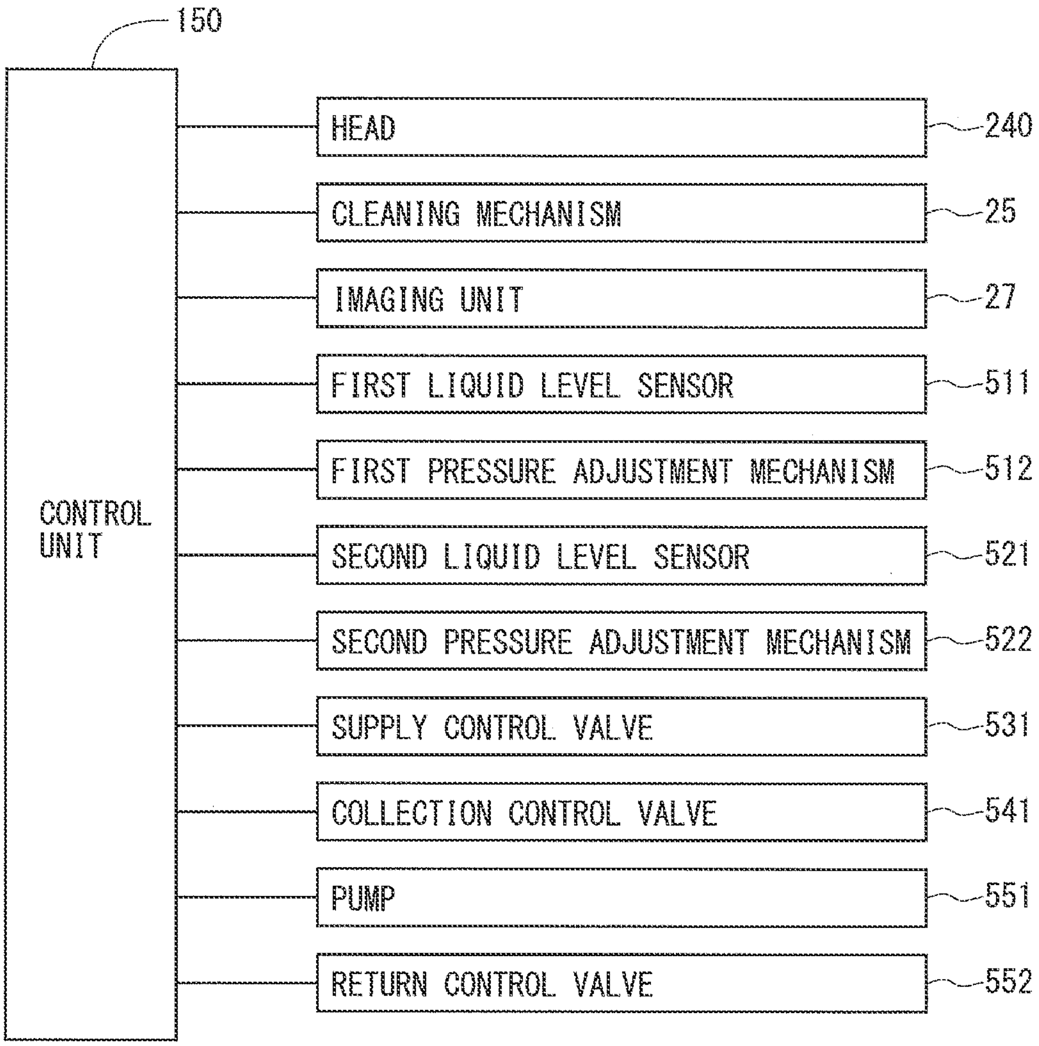
FIG. 9 is a block diagram for explaining the configuration related to the control of the ink supply mechanism in the embodiment.

FIG. 9 is a block diagram for explaining a configuration related to the control of the ink supply mechanism described above. As can be grasped from FIG. 9, the operations of the head 240, the cleaning mechanism 25, the first liquid level sensor 511, the first pressure adjustment mechanism 512, the second liquid level sensor 521, the second pressure adjustment mechanism 522, the supply control valve 531, the collection control valve 541, the pump 551, and the return control valve 552 are controlled by a control unit 150 achieved by executing the print control program 18 in the print controller 100.

6. Head Replacement Method 6.1 Basic Flow of Head Replacement

Before the description of a procedure for head replacement in the present embodiment, a basic flow of head replacement will be described. Here, attention is paid to the state and the like of each component in a case where head replacement is normally performed without any abnormality occurring in the conventional procedure. In FIGS. 10 to 15, the illustration of heads except for the replacement target head and components corresponding thereto is omitted. In the following description, circulating ink in the circulation flow path to cause the ink to be supplied only to a specific head among the plurality of heads 240 is referred to as a "single circulation".

Figure 10:
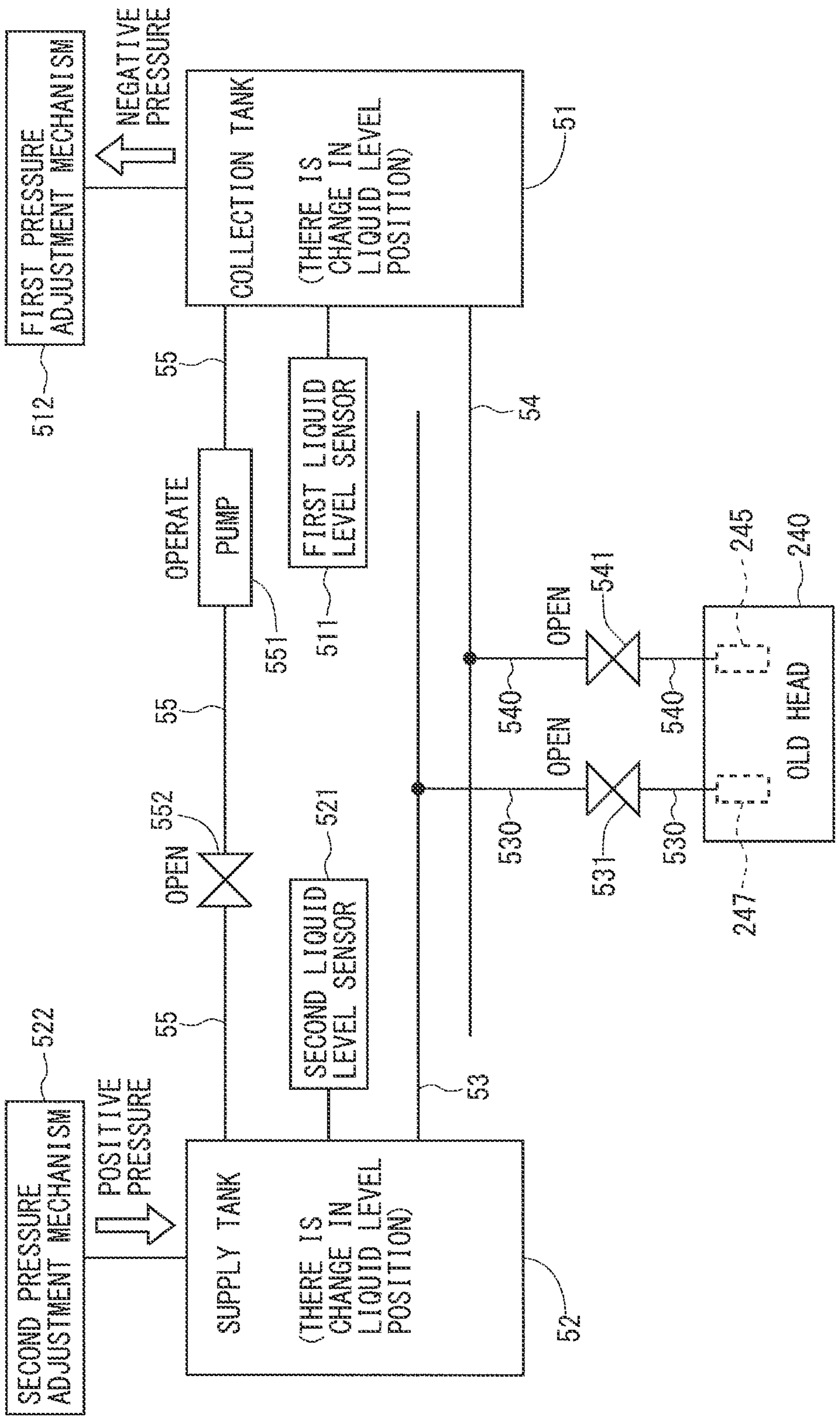
FIG. 10 is a diagram showing the state of the ink supply mechanism when ink is circulating normally in the circulation flow path before head replacement.

The state of the ink supply mechanism when ink is circulating normally in the circulation flow path before head replacement is as shown in FIG. 10. At this time, the supply control valve 531 corresponding to the replacement target head, the collection control valve 541 corresponding to the replacement target head, and the return control valve 552 are in an open state, and the pump 551 is in an operating state. Note that the supply control valves 531 corresponding to the heads except for the replacement target head and the collection control valves 541 corresponding to the heads except for the replacement target head are also in the open state. The first pressure adjustment mechanism 512 sets the air pressure in the collection tank 51 to a negative pressure, and the second pressure adjustment mechanism 522 sets the air pressure in the supply tank 52 to a positive pressure. Since ink is circulating in the circulation flow path, the first ink liquid level position (the height of the ink liquid level in the collection tank 51 detected by the first liquid level sensor 511) and the second ink liquid level position (the height of the ink liquid level in the supply tank 52 detected by the second liquid level sensor 521) sometimes change.

Figure 11:
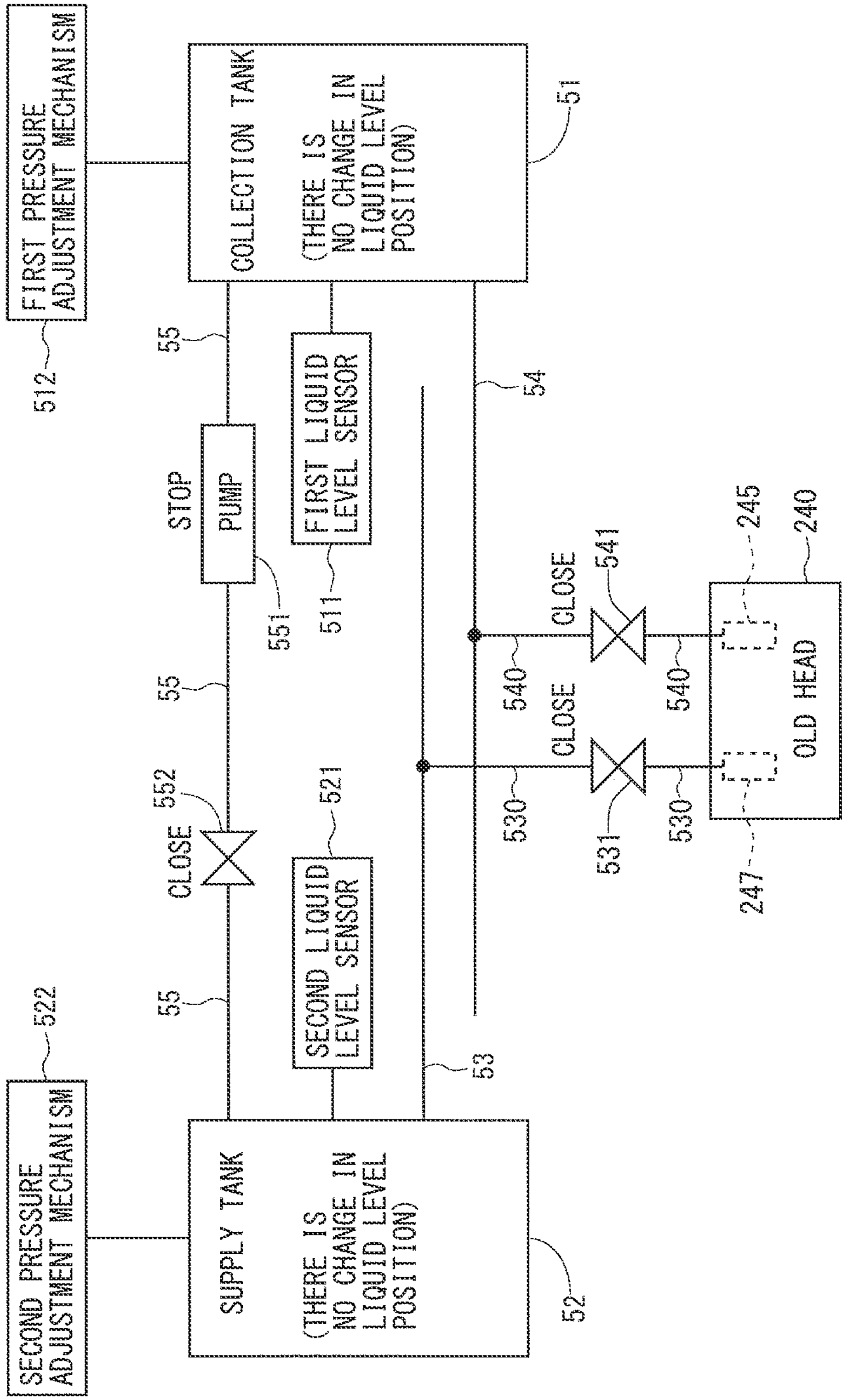
FIG. 11 is a diagram showing the state of the ink supply mechanism when the ink circulation in the circulation flow path is stopped.

The ink circulation in the circulation flow path is stopped prior to the actual replacement of an old head with a new head. The state of the ink supply mechanism when the ink circulation in the circulation flow path is stopped is as shown in FIG. 11. At this time, all the supply control valves 531, all the collection control valves 541, and the return control valves 552 are in a closed state, and the pump 551 is in a stopped state. Since the ink circulation in the circulation flow path is stopped, there is no inflow of ink into the collection tank 51 and no outflow of ink from the collection tank 51, and there is no inflow of ink into the supply tank 52 and no outflow of ink from the supply tank 52. Hence the first ink liquid level position and the second ink liquid level position do not change.

Figure 12:
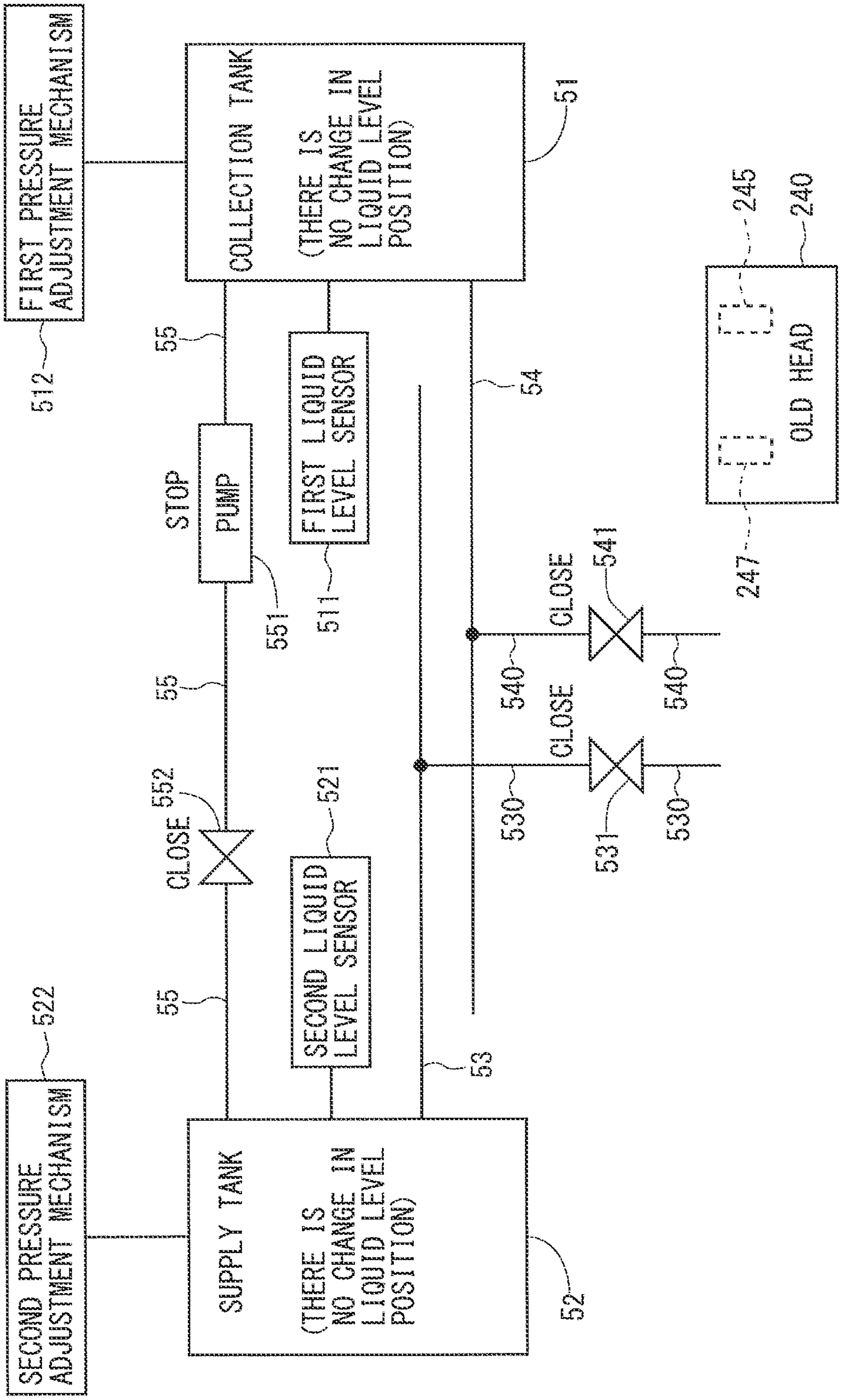
FIG. 12 is a diagram showing the state of the ink supply mechanism when an old head is removed from the head holding plate.

In a state where the ink circulation in the circulation flow path is stopped, the work of actually replacing the old head with the new head is performed. At this time, first, a drive signal wire (communication cable) is removed from the communication connector 243 (cf. FIG. 4) of the old head, and then, the collection branch pipe 540 and the supply branch pipe 530 are removed from the first non-spill 245 and the second non-spill 247 of the old head, respectively. Then, the old head is removed from the head holding plate 40. The state of the ink supply mechanism at this time is as shown in FIG. 12. Thereafter, the new head is attached to the head holding plate 40, the collection branch pipe 540 and the supply branch pipe 530 are connected to the first non-spill 245 and the second non-spill 247 of the new head, respectively, and the drive signal wire (communication cable) is connected to the communication connector 243 of the new head.

Figure 13:
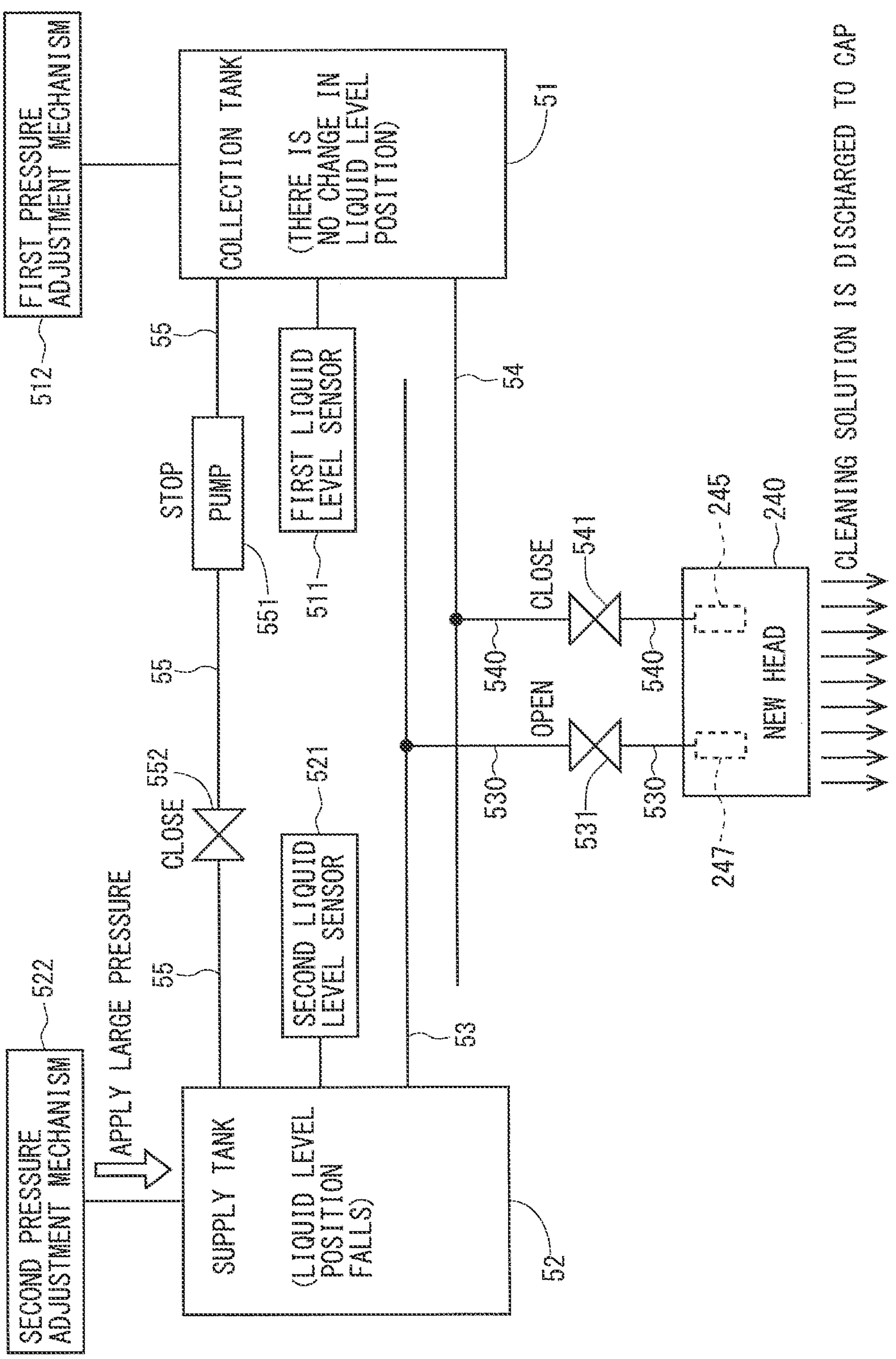
FIG. 13 is a diagram showing the state of the ink supply mechanism when cleaning is performed.

Thereafter, the supply control valve 531 corresponding to the new head is set to the open state, and the second pressure adjustment mechanism 522 greatly increases the air pressure in the supply tank 52 (large pressure is applied to the inside of the supply tank 52). As a result, the ink in the supply tank 52 flows to the new head 240 via the supply pipe 53 and the supply branch pipe 530, and the cleaning solution in the new head 240 is discharged to the head cleaning cap 252. In this manner, cleaning (pressurized purging) is performed. The state of the ink supply mechanism at this time is as shown in FIG. 13. At this time, the first ink liquid level position does not change, but the second ink liquid level position decreases.

Figure 14:
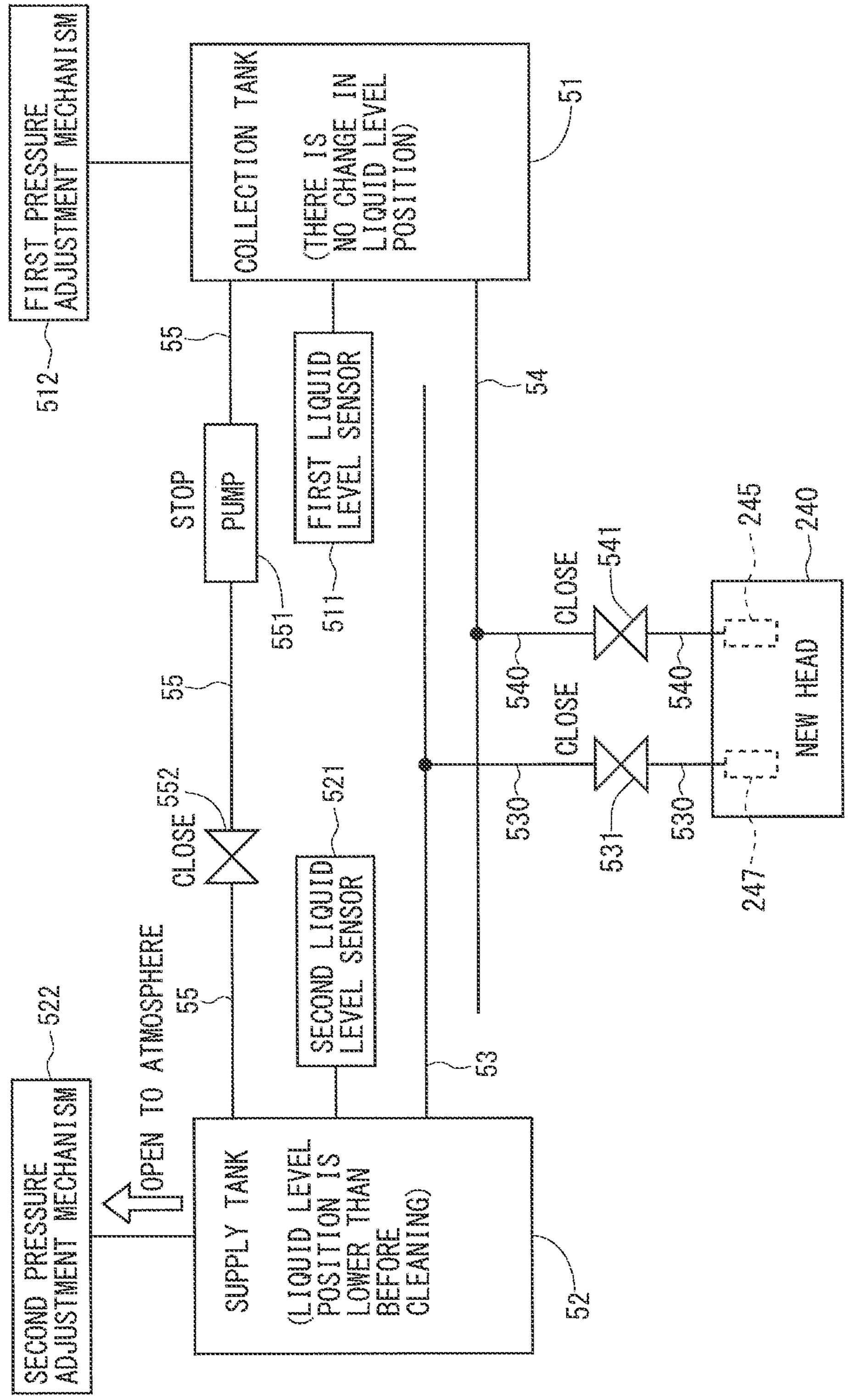
FIG. 14 is a diagram showing the state of the ink supply mechanism when the supply tank is opened to the atmosphere after the cleaning is performed.

Next, the supply control valve 531 corresponding to the new head is set to the closed state, and the second pressure adjustment mechanism 522 opens the supply tank 52 to the atmosphere. The state of the ink supply mechanism at this time is as shown in FIG. 14. The second ink liquid level position rises due to the opening to the atmosphere, but is lower than the position before cleaning. Note that the first ink liquid level position does not change.

Figure 15:
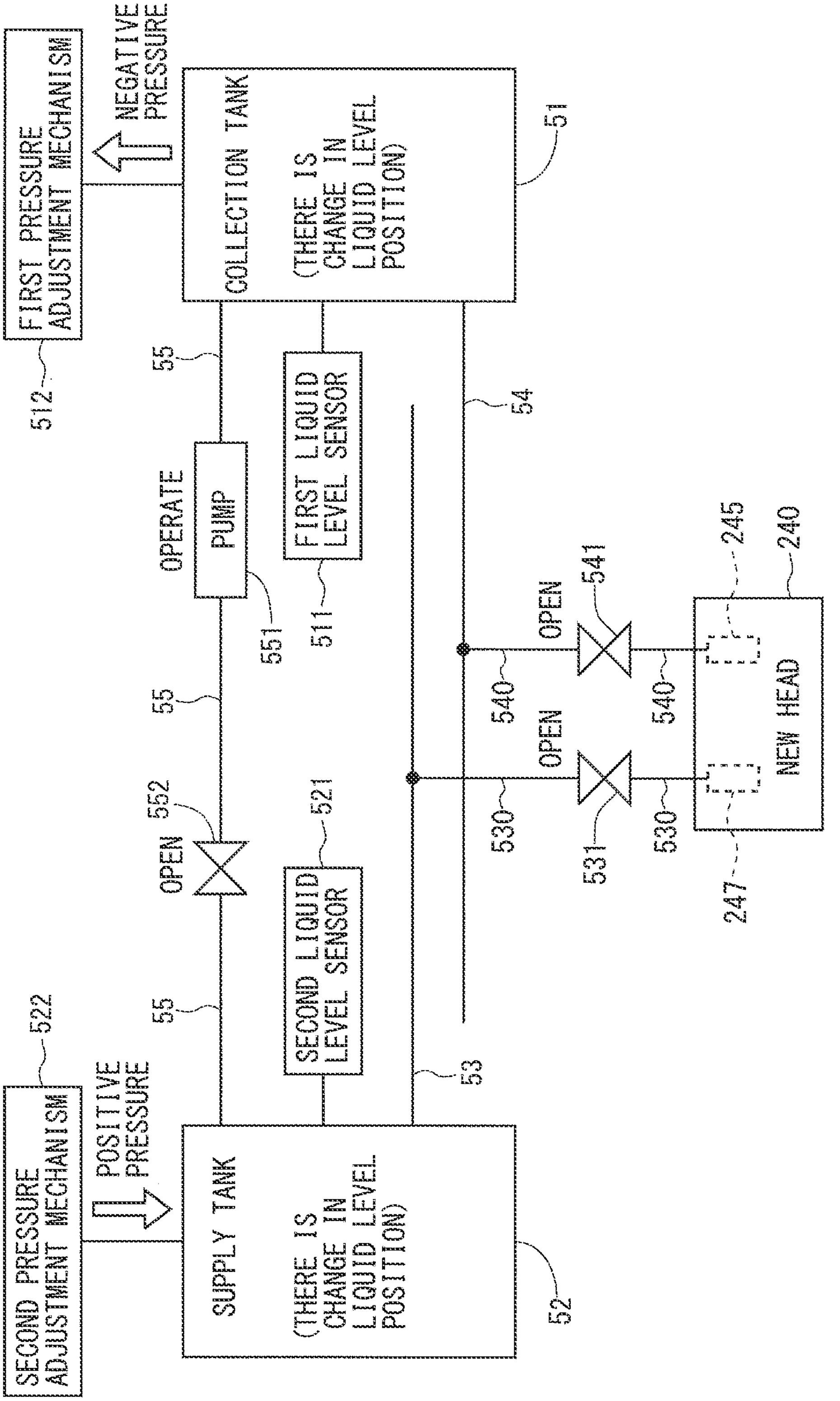
FIG. 15 is a diagram showing the state of the ink supply mechanism when the ink circulation in the circulation flow path is resumed after head replacement.

After the supply tank 52 is opened to the atmosphere, all the supply control valves 531 including the supply control valve 531 that corresponds to the new head, all the collection control valves 541 including the collection control valve 541 that corresponds to the new head, and the return control valve 552 are set to the open state, and the pump 551 is set to the operating state. The first pressure adjustment mechanism 512 sets the air pressure in the collection tank 51 to the negative pressure, and the second pressure adjustment mechanism 522 sets the air pressure in the supply tank 52 to the positive pressure. As above, the ink circulation in the circulation flow path is resumed. The state of the ink supply mechanism at this time is as shown in FIG. 15. Since the ink circulates in the circulation flow path, the first ink liquid level position and the second ink liquid level position sometimes change.

6.2 Head Replacement Processing

Figure 16:
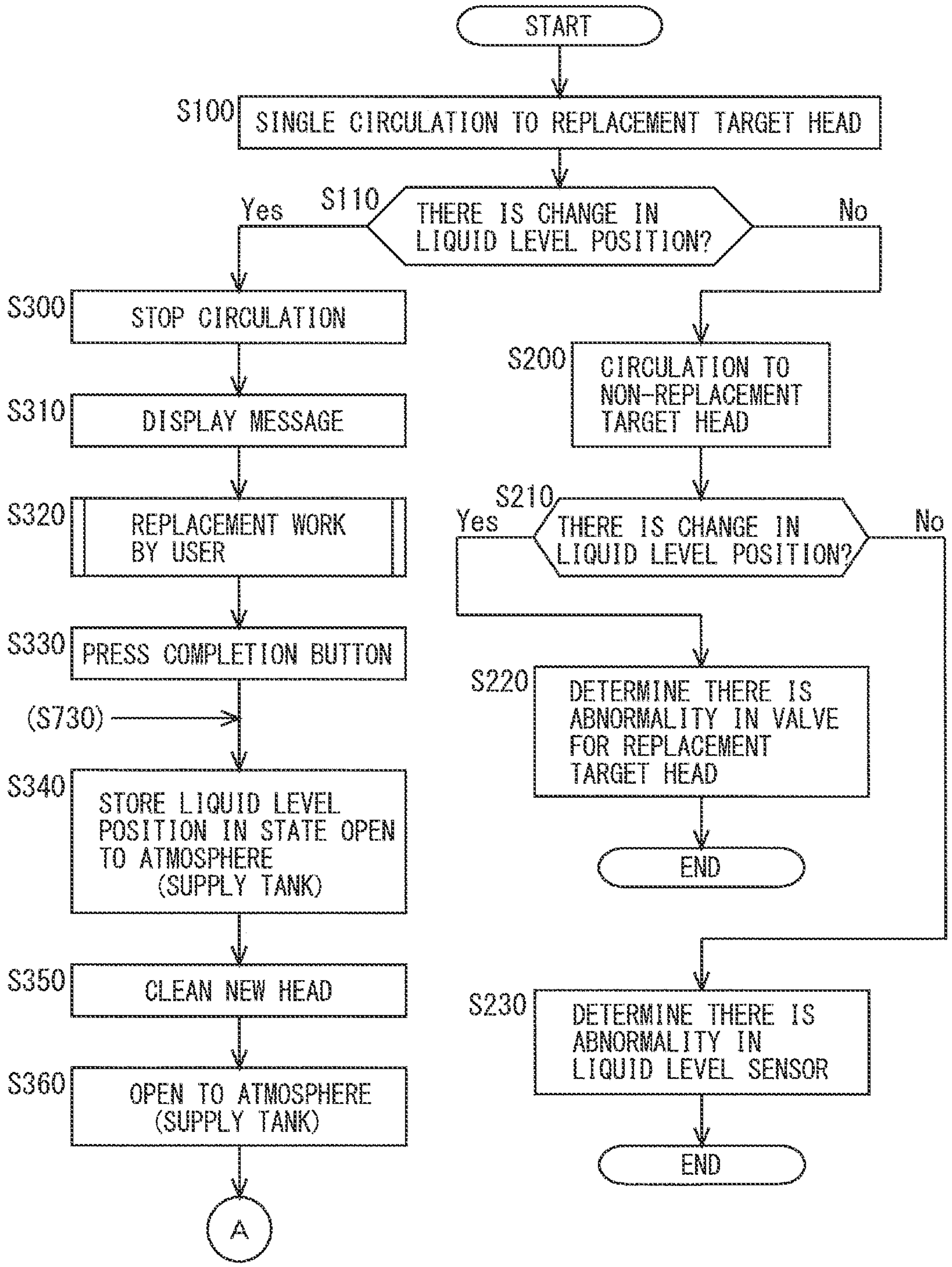
FIG. 16 is a flowchart showing a procedure for head replacement processing in the embodiment.
Figure 17:
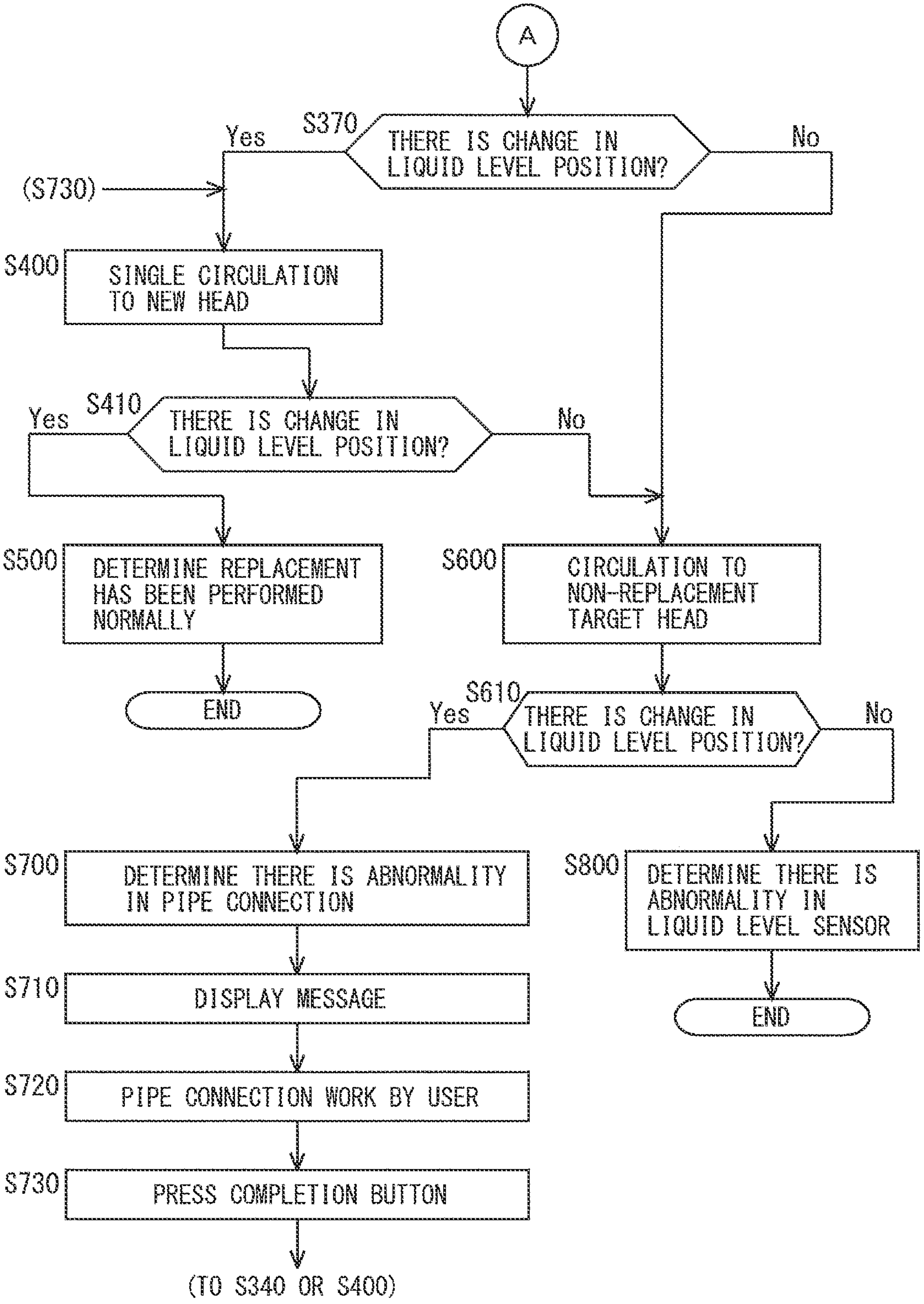
FIG. 17 is a flowchart showing the procedure for the head replacement processing in the embodiment.

Based on the above, the head replacement processing (a series of processing related to head replacement including the work of actually replacing an old head with a new head) in the present embodiment will be described. FIGS. 16 and 17 are flowcharts showing a procedure for the head replacement processing in the present embodiment.

Figure 18:
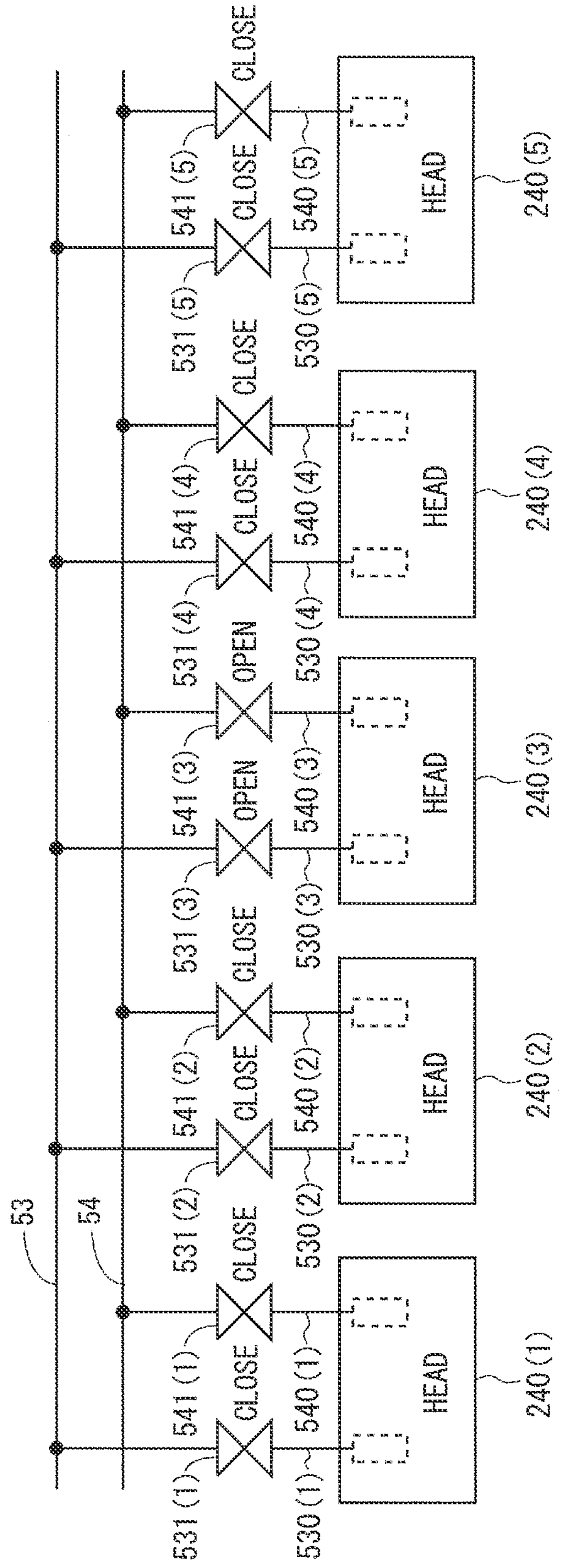
FIG. 18 is a diagram for explaining setting only a valve corresponding to a replacement target head to an open state in the embodiment.

The control unit 150 sequentially performs the determination as to whether head replacement is necessary, and the identification of the replacement target head when head replacement is necessary, based on the imaging result of the printed image by the imaging unit 27 and the like. When head replacement is required, the control unit 150 starts the head replacement processing. First, a single circulation of ink to the replacement target head is performed (step S100). Specifically, circulation of ink is performed while setting only the valve corresponding to the replacement target head among the supply control valves 531(1) to 531(5) and the collection control valves 541(1) to 541(5) to the open state. For example, when the head 240(3) is the replacement target head, as shown in FIG. 18, only the supply control valve 531(3) and the collection control valve 541(3) among the supply control valves 531(1) to 531(5) and the collection control valves 541(1) to 541(5) are set to the open state. The air pressure in the collection tank 51 is set to the negative pressure, and the air pressure in the supply tank 52 is set to the positive pressure. Note that the return control valve 552 is in the open state, and the pump 551 is in the operating state. In the manner as described above, ink is circulated in the circulation flow path to cause the ink to be supplied only to the replacement target head among the plurality of heads 240 constituting the head unit 2.

Next, the first ink liquid level position and the second ink liquid level position are continuously checked in a state where the single circulation of ink to the replacement target head is performed, and it is determined whether there is a change in both the first ink liquid level position and the second ink liquid level position (step S110). As a result, when there is a change in both the first ink liquid level position and the second ink liquid level position, the processing proceeds to step S300, and when there is no change in at least one of the first ink liquid level position and the second ink liquid level position, the processing proceeds to step S200.

In step S200, ink is circulated to the non-replacement target head. Specifically, circulation of ink is performed while setting only the valve corresponding to the replacement target head among the supply control valves 531(1) to 531(5) and the collection control valves 541(1) to 541(5) to the closed state.

Next, the first ink liquid level position and the second ink liquid level position are checked in a state where the circulation of ink to the non-replacement target head is performed, and it is determined whether there is a change in both the first ink liquid level position and the second ink liquid level position (step S210). As a result, when there is a change in both the first ink liquid level position and the second ink liquid level position, it is determined that there is an abnormality in the valve corresponding to the replacement target head (step S220), and when there is no change in at least one of the first ink liquid level position and the second ink liquid level position, it is determined that there is an abnormality in the liquid level sensor (step S230). When it is determined in step S220 or step S230 that an abnormality has occurred, the device in which the abnormality has occurred is repaired or replaced by a service person or the like, and then the processing is performed again from step S100. In step S220, the determination is performed as follows in detail. When there is no change in the first ink liquid level position in step S110, it is determined that there is an abnormality in the collection control valve 541 corresponding to the replacement target head, and when there is no change in the second ink liquid level position in step S110, it is determined that there is an abnormality in the supply control valve 531 corresponding to the replacement target head. Further, in step S230, the determination is performed as follows in detail. When there is no change in the first ink liquid level position in step S110, it is determined that there is an abnormality in the first liquid level sensor 511. When there is no change in the second ink liquid level position in step S110, it is determined that there is an abnormality in the second liquid level sensor 521.

In step S300, the ink circulation in the circulation flow path is stopped. Specifically, the supply control valves 531(1) to 531(5), the collection control valves 541(1) to 541(5), and the return control valve 552 are set to the closed state, and the pump 551 is set to the stopped state, whereby the ink circulation in the circulation flow path is stopped.

Figure 19:
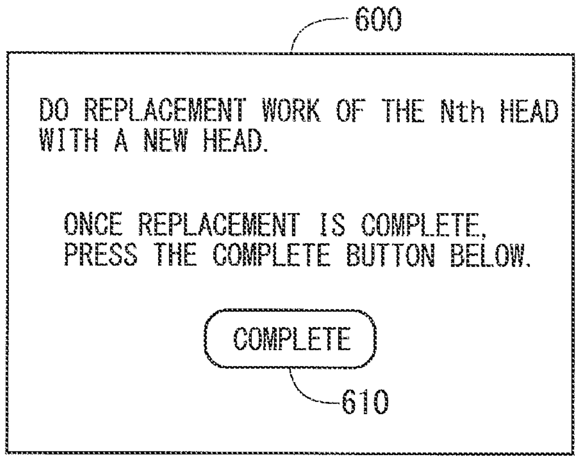
FIG. 19 is a diagram showing an example of a head replacement screen in the embodiment.

Thereafter, a head replacement screen 600 as shown in FIG. 19, for example, including a message prompting the user to replace the head is displayed on the display unit 123 of the print controller 100 (step S310). Note that "N" in FIG. 19 is a temporary number for specifying the old head to be replaced. The head replacement screen 600 includes a complete button 610 to be pressed by the user after the user finishes the head replacement work.

After the display of the head replacement screen, the user performs head replacement work (step S320). That is, the user performs the work of actually removing the old head from the head unit 2 and attach the new head to the head unit 2.

Figure 20:
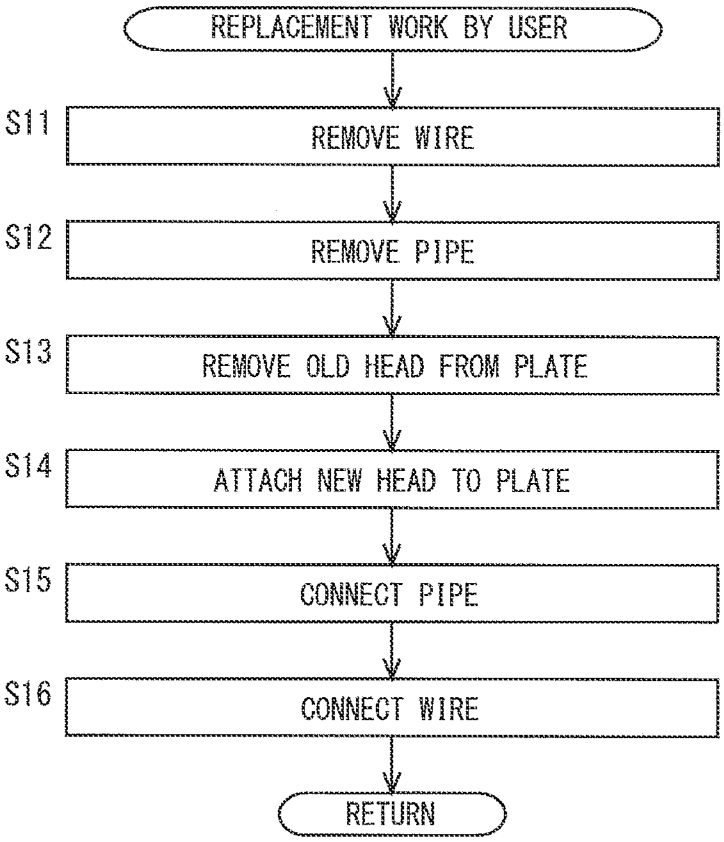
FIG. 20 is a flowchart showing a procedure for head replacement work performed by the user in the embodiment.

FIG. 20 is a flowchart showing a procedure for the head replacement work performed by the user. First, the user removes the drive signal wire from the communication connector 243 (cf. FIG. 4) of the replacement target head (step S11). Next, the user removes the ink supply pipe (step S12). Specifically, the user removes the collection branch pipe 540 and the supply branch pipe 530 from the first non-spill 245 and the second non-spill 247 of the replacement target head, respectively. That is, the ink discharge pipe 244 included in the replacement target head is removed from the collection branch pipe 540, and the ink inflow pipe 246 included in the replacement target head is removed from the supply branch pipe 530. Next, the user removes the old head, which is the replacement target head, from the head holding plate 40 (step S13). Thereafter, the user attaches the new head to the head holding plate 40 (step S14). Next, the user connects the ink supply pipe (step S15). Specifically, the user connects the collection branch pipe 540 and the supply branch pipe 530 to the first non-spill 245 and the second non-spill 247 of the new head, respectively. That is, the ink discharge pipe 244 included in the new head is connected to the collection branch pipe 540, and the ink inflow pipe 246 included in the new head is connected to the supply branch pipe 530. Finally, the user connects the drive signal wire to the communication connector 243 of the new head (step S16).

In the present embodiment, a pipe removal step is achieved by step S12, a head removal step is achieved by step S13, a head attachment step is achieved by step S14, and a pipe connection step is achieved by step S15.

After the user performs the head replacement work as described above, the user presses the above-described Complete button 610 included in the head replacement screen 600 (cf. FIG. 19) displayed on the display unit 123 of the print controller 100 (step S330). In this manner, the print controller 100 receives an input indicating that the replacement (replacement) of the head has been completed.

After the complete button 610 is pressed, the second pressure adjustment mechanism 522 opens the supply tank 52 to the atmosphere. Then, the ink liquid level position (second ink liquid level position) of the supply tank 52 in the state of being open to the atmosphere is detected by the second liquid level sensor 521, and the detected ink liquid level position is stored (step S340). At this time, the supply control valves 531(1) to 531(5), the collection control valves 541(1) to 541(5), and the return control valve 552 are set to the closed state.

Next, the new head is cleaned (step S350). In step S350, first, the cleaning mechanism 25 moves from the away position to the home position. Then, after only the supply control valve 531 corresponding to the new head is set to the open state, the second pressure adjustment mechanism 522 greatly increases the air pressure in the supply tank 52 (large pressure is applied to the inside of the supply tank 52). As a result, ink flows from the supply tank 52 to the new head, and the cleaning solution in the new head is discharged to the cap 252 covering the new head. Note that the new head may be cleaned by the first pressure adjustment mechanism 512 greatly increasing the air pressure in the collection tank 51 while setting only the collection control valve 531 corresponding to the new head to the open state. Although the cleaning solution in the new head is discharged to the cap 252 by pressurized purging in the present embodiment, the present invention is not limited thereto, and the cleaning solution in the new head may be discharged to the cap 252 by suction purging using a suction pump connected to the cap 252.

Next, the supply control valve 531 corresponding to the new head is set to the closed state, and thereafter, the second pressure adjustment mechanism 522 opens the supply tank 52 to the atmosphere. Then, the ink liquid level position (second ink liquid level position) of the supply tank 52 in the state of being open to the atmosphere is detected by the second liquid level sensor 521 (step S360).

Next, it is determined whether the ink liquid level position detected in step S360 has changed from the ink liquid level position stored in step S340 (step S370). More specifically, it is determined whether the ink liquid level position detected in step S360 is lower than the ink liquid level position stored in step S340. As a result, when the ink liquid level position detected in step S360 is lower than the ink liquid level position stored in step S340, the processing proceeds to step S400. When the ink liquid level position detected in step S360 is not lower than the ink liquid level position stored in step S340, the processing proceeds to step S600. When no abnormality has occurred, the ink liquid level position detected in step S360 is lower than the ink liquid level position stored in step S340.

In step S400, the single circulation of ink to the new head is performed (step S400). Specifically, circulation of ink is performed while setting only the valve corresponding to the new head among the supply control valves 531(1) to 531(5) and the collection control valves 541(1) to 541(5) to the open state. At this time, the air pressure in the collection tank 51 is set to the negative pressure, the air pressure in the supply tank 52 is set to the positive pressure, the return control valve 552 is set to the open state, and the pump 551 is set to the operating state.

Thereafter, the first ink liquid level position is continuously checked in a state where the single circulation of ink to the new head is performed, and it is determined whether there is a change in the first ink liquid level position (step S410). As a result, when there is a change in the first ink liquid level position, it is determined that the head replacement has been performed normally (step S500), and the head replacement processing ends. On the other hand, when there is no change in the first ink liquid level position, the processing proceeds to step S600.

In step S600, as in step S200, ink is circulated to the non-replacement target head. Next, the first ink liquid level position and the second ink liquid level position are checked in a state where the circulation of ink to the non-replacement target head is performed, and it is determined whether there is a change in both the first ink liquid level position and the second ink liquid level position (step S610). As a result, when there is a change in both the first ink liquid level position and the second ink liquid level position, the processing proceeds to step S700. On the other hand, when there is no change in at least one of the first ink liquid level position and the second ink liquid level position, it is determined that there is an abnormality in the liquid level sensor (step S800), and the head replacement processing ends temporarily. At this time, after a service person or the like repairs or replaces the liquid level sensor in which the abnormality has occurred, for example, the processing is performed again from step S340. In step S800, the determination is performed as follows in detail. When there is no change in the first ink liquid level position in step S410, it is determined that there is an abnormality in the first liquid level sensor 511. When there is no change in the second ink liquid level position in step S370, it is determined that there is an abnormality in the second liquid level sensor 521.

In step S700, it is determined that there is an abnormality in the pipe connection. Specifically, when there is no change in the first ink liquid level position in step S410, it is determined that there is an abnormality in the connection between the ink discharge pipe 244 and the collection branch pipe 540 via the first non-spill 245 for the new head. When there is no change in the second ink liquid level position in step S370, it is determined that there is an abnormality in the connection between the ink inflow pipe 246 and the supply branch pipe 530 via the second non-spill 247 for the new head.

Figure 21:
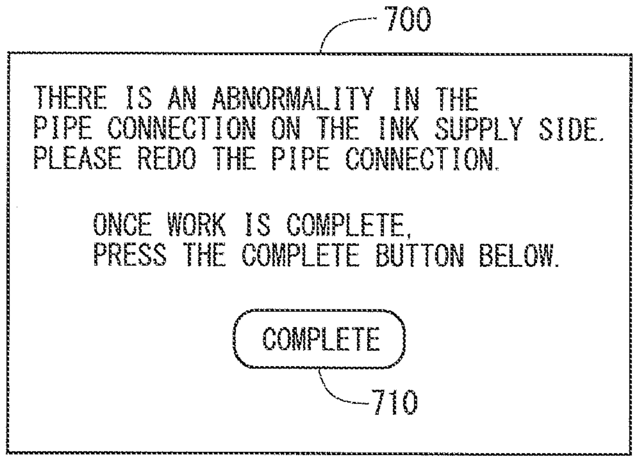
FIG. 21 is a diagram showing an example of a pipe connection promotion screen in the embodiment.

Thereafter, a pipe connection promotion screen 700 as shown in FIG. 21, for example, including a message prompting the user to redo the pipe connection is displayed on the display unit 123 of the print controller 100 (step S710). The pipe connection promotion screen 700 includes a Complete button 710 to be pressed by the user after the user finishes the pipe connection work. FIG. 21 shows an example of a message in a state where there is an abnormality in the connection between the ink inflow pipe 246 and the supply branch pipe 530 via the second non-spill 247 with respect to the new head.

After the display of the pipe connection promotion screen 700, the user redoes the pipe connection (the connection between the ink discharge pipe 244 and the collection branch pipe 540 via the first non-spill 245 and the connection between the ink inflow pipe 246 and the supply branch pipe 530 via the second non-spill 247 with respect to the new head) (step S720).

After the user redoes the pipe connection, the user presses the above-described complete button 710 included in the pipe connection promotion screen 700 (cf. FIG. 21) displayed on the display unit 123 of the print controller 100 (step S730).

After step S730 ends, the processing returns to step S340 or step S400. In this regard, when there is no change in the second ink liquid level position in step S370, the processing returns to step S340, and when there is no change in the first ink liquid level position in step S410, the processing returns to step S400.

Note that the determination results in steps S500, S600, and S700 are displayed on the display unit 123 of the print controller 100. That is, a determination result as to whether the pipe connection has been made properly is displayed on the display unit 123. Therefore, the user can quickly grasp whether the pipe connection has been made properly after head replacement.

In the present embodiment, an ink liquid level position pre-checking step is achieved by steps S100 and S110, a liquid level sensor inspection step is achieved by steps S200 and S210, a message output step is achieved by step S310, a replacement completion reception step is achieved by step S330, a supply-side connection state determination step is achieved by steps S340, S350, S360, and S370, an ink circulation start step is achieved by step S400, and a connection state determination step is achieved by steps S410, S500, S600, S610, S700, and S800. A second ink liquid level position storage step is achieved by step S340, a pressurization step is achieved by step S350, a second ink liquid level position checking step is achieved by step S360 and step S370, a first ink liquid level position checking step is achieved by step S410, and an ink liquid level position rechecking step is achieved by step S600 and step S610.

7 Effects

According to the present embodiment, after the user finishes the replacement of the head 240, it is determined whether the pipe connection, including the connection between the ink discharge pipe 244 and the collection branch pipe 540 and the connection between the ink inflow pipe 246 and the supply branch pipe 530, has been made properly based on the ink liquid level position (the height of the ink liquid level) in the collection tank 51 and the supply tank 52. Even when the ink circulation in the circulation flow path is started, when there is an abnormality in the pipe connection, the ink liquid level position does not change. Therefore, with the configuration of the present embodiment, it is possible to detect an abnormality in the pipe connection without performing printing on the printing medium. Since an abnormality in the pipe connection can be detected before printing on the printing medium, wasteful consumption of ink and printing media is reduced. Thus, it is possible to contribute to the achievement of the Sustainable Development Goals (SDGs). As described above, according to the present embodiment, it is possible to provide a head replacement method capable of detecting an abnormality in pipe connection without performing printing regarding an inkjet printing apparatus. In addition, according to the present embodiment, when an abnormality occurs due to head replacement, it is possible to quickly identify the cause of the abnormality (defective portion). Specifically, it is possible to identify which of the following has an abnormality: the connection between the ink discharge pipe 244 and the collection branch pipe 540, the connection between the ink inflow pipe 246 and the supply branch pipe 530, the first liquid level sensor 511, the second liquid level sensor 521, the collection control valve 541, and the supply control valve 542.

8. Modifications

Modifications of the above embodiment will be described below.

8.1 First Modification

Figure 22:
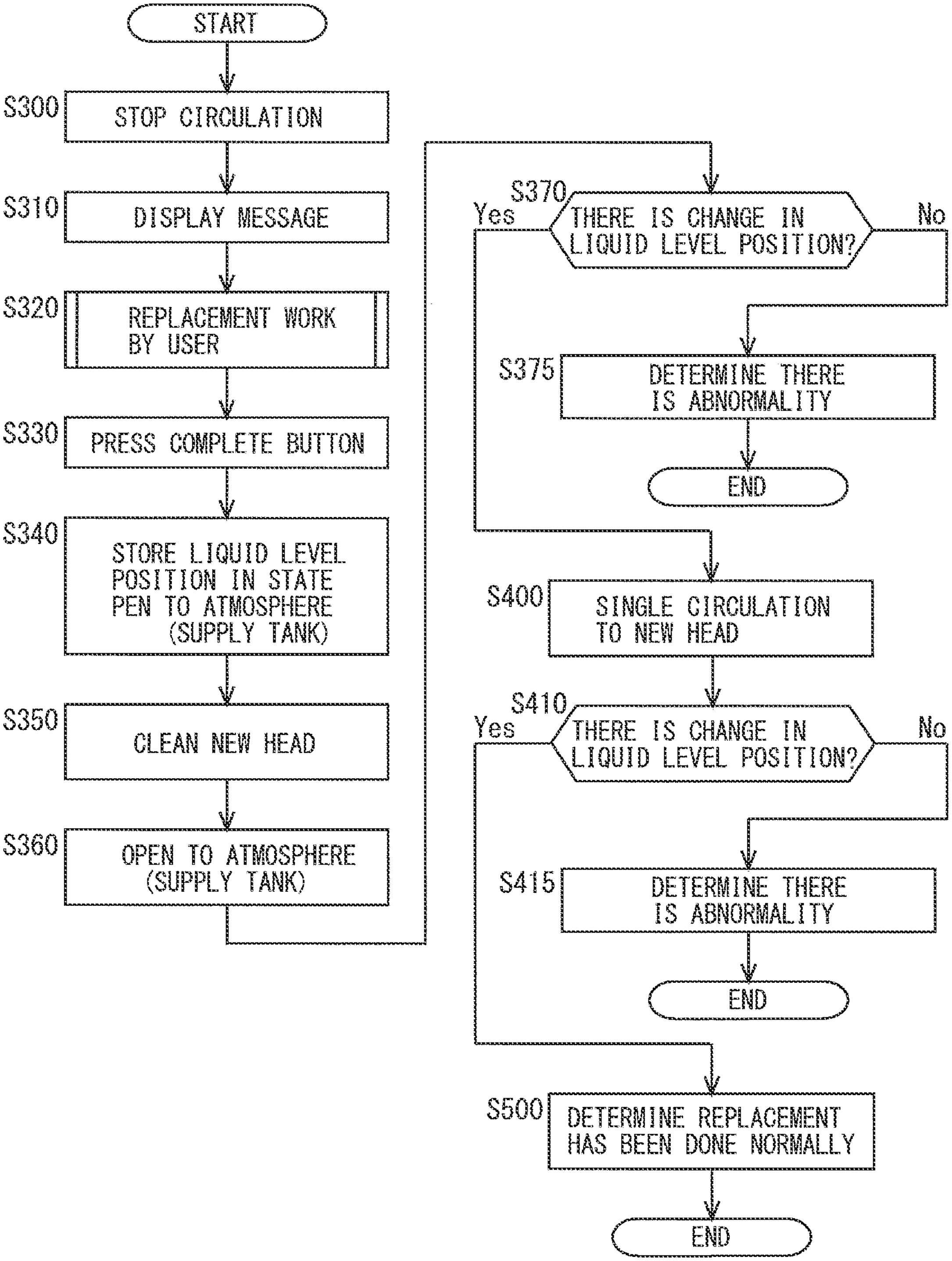
FIG. 22 is a flowchart showing a procedure for head replacement processing in a first modification of the embodiment.

FIG. 22 is a flowchart showing a procedure for head replacement processing in a first modification of the embodiment. In the present modification, first, after the start of the head replacement processing, the ink circulation in the circulation flow path is stopped (step S300). Thereafter, the processes of steps S310 to S360 similar to those in the above embodiment are performed. Then, in step S370, it is determined whether the ink liquid level position detected in step S360 is lower than the ink liquid level position stored in step S340. As a result, when the ink liquid level position detected in step S360 is lower than the ink liquid level position stored in step S340, the processing proceeds to step S400. On the other hand, when the ink liquid level position detected in step S360 is not lower than the ink liquid level position stored in step S340, it is determined that there is some abnormality (step S375), and the head replacement processing ends temporarily.

In step S400, the single circulation of ink to the new head is performed. Then, the first ink liquid level position is continuously checked in a state where the single circulation of ink to the new head is performed, and it is determined whether there is a change in the first ink liquid level position (step S410). As a result, when there is a change in the first ink liquid level position, it is determined that the head replacement has been performed normally (step S500), and the head replacement processing ends. On the other hand, when there is no change in the first ink liquid level position, it is determined that there is some abnormality (step S415), and the head replacement processing ends temporarily.

When it is determined in step S375 or step S415 that there is any abnormality, the head replacement processing is performed again from an appropriate step after a service person or the like identifies the cause of the abnormality and takes measures (e.g., repairs or replaces equipment).

In the present modification, a message output step is achieved by step S310, a replacement completion reception step is achieved by step S330, a supply-side connection state determination step is achieved by steps S340, S350, S360, and S370, an ink circulation start step is achieved by step S400, and a connection state determination step is achieved by steps S410, S415, and S500. A second ink liquid level position storage step is achieved by step S340, a pressurization step is achieved by step S350, a second ink liquid level position checking step is achieved by step S360 and step S370, and a first ink liquid level position checking step is achieved by step S410.

As described above, in the present modification, the processes of steps S100 to S230 in the above embodiment (cf. FIG. 16) are not provided. That is, in the present modification, the process of checking the presence or absence of an abnormality in the valve or the liquid level sensor by performing the single circulation of ink to the replacement target head (old head) before stopping the ink circulation in the circulation flow path (step S300) is not performed. Furthermore, in the present modification, the processes of steps S600 to S800 in the above embodiment (cf. FIG. 17) are not provided. That is, in the present modification, when the ink liquid level position does not normally change after the replacement of the head 240, the process of checking whether there is an abnormality in the liquid level sensor or the pipe connection while circulating the ink to the non-replacement target head is not performed.

According to the present modification, it is not possible to quickly identify the cause of an abnormality that has occurred at the time of head replacement, but it is possible to determine whether the head replacement has been performed normally without performing printing.

8.2 Second Modification

Figure 23:
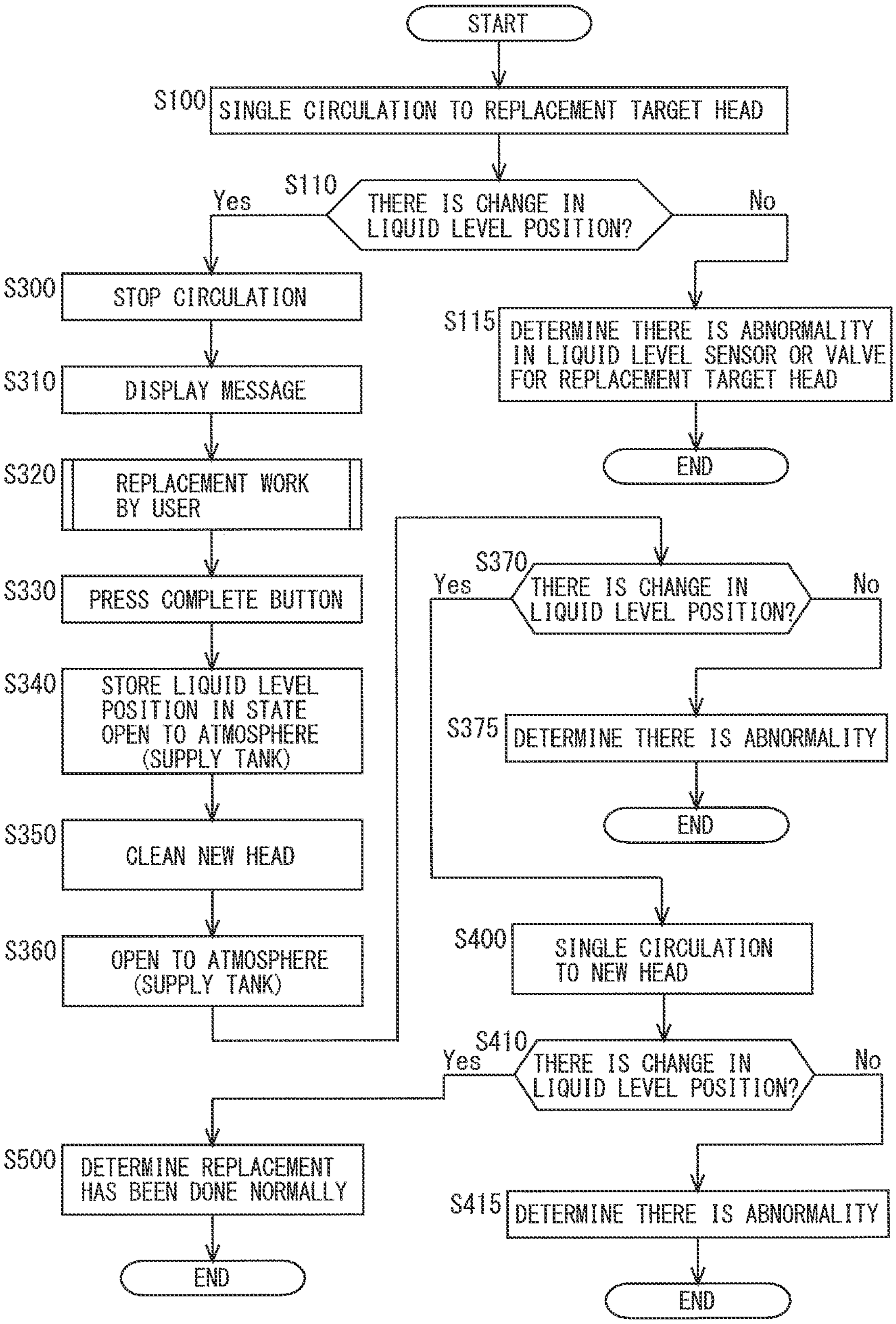
FIG. 23 is a flowchart showing a procedure for head replacement processing in a second modification of the embodiment.

FIG. 23 is a flowchart showing a procedure for head replacement processing in a second modification of the embodiment. In the present modification, after the start of the head replacement processing, first, the single circulation of ink to the replacement target head (old head) is performed (step S100). Then, the first ink liquid level position and the second ink liquid level position are continuously checked in a state where the single circulation of ink to the replacement target head is performed, and it is determined whether there is a change in both the first ink liquid level position and the second ink liquid level position (step S110). As a result, when there is a change in both the first ink liquid level position and the second ink liquid level position, the processing proceeds to step S300. On the other hand, when there is no change in at least one of the first ink liquid level position and the second ink liquid level position, it is determined that there is an abnormality in the liquid level sensor or the valve corresponding to the replacement target head (step S115), and the head replacement processing ends temporarily. The processes after step S300 are similar to those in the first modification. However, when there is a change in both the first ink liquid level position and the second ink liquid level position in step S110, it is grasped that there is no abnormality in the valves (the collection control valve 541 and the supply control valve 542) corresponding to the replacement target head. Therefore, it is determined that there is an abnormality in the second liquid level sensor 521 in step S375, and it is determined that there is an abnormality in the first liquid level sensor 511 in step S415. When it is determined in step S115 that there is an abnormality in the liquid level sensor or the valve corresponding to the replacement target head, the head replacement processing is performed again from step S100 after a service person or the like identifies the cause of the abnormality and takes measures (e.g., repairs or replaces equipment).

In the present modification, an ink liquid level position pre-checking step is achieved by steps S100 and S110, a message output step is achieved by step S310, a replacement completion reception step is achieved by step S330, a supply-side connection state determination step is achieved by steps S340, S350, S360, and S370, an ink circulation start step is achieved by step S400, and a connection state determination step is achieved by steps S410, S415, and S500. A second ink liquid level position storage step is achieved by step S340, a pressurization step is achieved by step S350, a second ink liquid level position checking step is achieved by step S360 and step S370, and a first ink liquid level position checking step is achieved by step S410.

As above, in the present modification, the processes of steps S600 to S800 in the above embodiment (cf. FIG. 17) are not provided. That is, in the present modification, when the ink liquid level position does not normally change after the replacement of the head 240, the process of checking whether there is an abnormality in the liquid level sensor or the pipe connection while circulating the ink to the non-replacement target head is not performed.

According to the present modification, when the abnormality occurs after the replacement of the head, the possibility that the cause of the abnormality is the valve can be eliminated. In addition, as in the first modification, it is not possible to quickly identify the cause of an abnormality that has occurred at the time of head replacement, but it is possible to determine whether the head replacement has been performed normally without performing printing.

9. Others

The present invention is not limited to the above embodiment (including the modifications), and various modifications can be made without departing from the gist of the present invention. For example, although one head is replaced at a time in the above embodiment (including the modifications), the present invention is also established even when a plurality of (e.g., two) heads are replaced at a time. In this case, the plurality of heads are the "replacement target heads" in the present invention. Further, for example, although the configuration of the inkjet printing apparatus 10 that performs color printing has been exemplified in the above embodiment, the present invention can also be applied to a case where an inkjet printing apparatus that performs monochrome printing is adopted.

Although the present invention has been described in detail above, the above description is illustrative in all aspects and is not restrictive. It is understood that numerous other modifications and variations can be devised without departing from the scope of the present invention.

This application is an application claiming priority based on Japanese Patent Application No. 2022-147034 entitled "Head Replacement Method, Inkjet Printing Apparatus, and Head Replacement Support Program" filed on Sep. 15, 2022, and the contents of which are herein incorporated by reference.

What is claimed is:

1. A head replacement method for replacing a replacement target head that is at least one of a plurality of heads in an inkjet printing apparatus including the plurality of heads each configured to eject ink toward a printing medium, a head holding plate configured to hold the plurality of heads, and an ink supply mechanism configured to supply ink to each of the plurality of heads, the ink supply mechanism including a supply tank configured to store ink to be supplied to each of the plurality of heads, a collection tank configured to store ink collected from each of the plurality of heads, a supply pipe forming a flow path for ink supplied from the supply tank to each of the plurality of heads, a collection pipe forming a flow path for ink collected from each of the plurality of heads to the collection tank, a recirculation pipe configured to recirculate ink from the collection tank to the supply tank, a supply branch pipe forming a flow path for ink flowing from the supply pipe to each of the plurality of heads, and a collection branch pipe forming a flow path for ink flowing from each of the plurality of heads to the collection pipe, each of the plurality of heads including an ink discharge pipe, a first connector for connecting the ink discharge pipe and the collection branch pipe;

an ink inflow pipe, and a second connector for connecting the ink inflow pipe and the supply branch pipe, the supply tank, the supply pipe, the supply branch pipe, the ink inflow pipe, the ink discharge pipe, the collection branch pipe, the collection pipe, the collection tank, and the recirculation pipe forming a circulation flow path through which ink circulates, the head replacement method comprising:

a pipe removal step of removing the ink inflow pipe included in the replacement target head from the supply branch pipe and removing the ink discharge pipe included in the replacement target head from the collection branch pipe;

a head removal step of removing the replacement target head from the head holding plate;

a head attachment step of attaching a new head to be used as a replacement of the replacement target head to the head holding plate;

a pipe connection step of connecting the ink discharge pipe included in the new head to the collection branch pipe via the first connector and connecting the ink inflow pipe included in the new head to the supply branch pipe via the second connector;

an ink circulation start step of starting circulation of ink in the circulation flow path after the head attachment step and the pipe connection step; and a connection state determination step of determining, after the ink circulation start step, based on an ink liquid level position representing a height of an ink liquid level in at least one of the collection tank and the supply tank, whether a pipe connection, including a connection between the ink discharge pipe and the collection branch pipe via the first connector and a connection between the ink inflow pipe and the supply branch pipe via the second connector, is properly made in the pipe connection step.

2. The head replacement method according to claim 1, wherein the connection state determination step includes a first ink liquid level position checking step of continuously checking a first ink liquid level position representing a height of an ink liquid level in the collection tank, and in the connection state determination step, when there is a change in the first ink liquid level position checked in the first ink liquid level position checking step, it is determined that the pipe connection is properly made.

3. The head replacement method according to claim 2, wherein in the ink circulation start step, the circulation of ink in the circulation flow path is started to cause the ink to be supplied only to the new head among the plurality of heads, and in the first ink liquid level position checking step, the first ink liquid level position is continuously checked in a state where ink is circulated in the circulation flow path to cause the ink to be supplied only to the new head among the plurality of heads.

4. The head replacement method according to claim 2, wherein the ink supply mechanism includes a first liquid level sensor configured to detect the first ink liquid level position, the connection state determination step includes an ink liquid level position rechecking step of continuously checking the first ink liquid level position in a state where ink is circulated in the circulation flow path to cause the ink to be supplied only to a non-replacement target head being a head that is not replaced among the plurality of heads, when there is no change in the first ink liquid level position checked in the first ink liquid level position checking step, and in the connection state determination step, when there is a change in the first ink liquid level position checked in the ink liquid level position rechecking step, it is determined that there is an abnormality in the connection between the ink discharge pipe and the collection branch pipe via the first connector, and when there is no change in the first ink liquid level position checked in the ink liquid level position rechecking step, it is determined that there is an abnormality in the first liquid level sensor.

5. The head replacement method according to claim 2, further comprising a supply-side connection state determination step of determining whether the connection between the ink inflow pipe and the supply branch pipe via the second connector is properly made in the pipe connection step based on a second ink liquid level position representing a height of an ink liquid level in the supply tank in a state where only a flow of ink from the supply tank to the ink inflow pipe via the supply pipe and the supply branch pipe occurs in the circulation flow path after the head attachment step and the pipe connection step and before the ink circulation start step.

6. The head replacement method according to claim 5, wherein the supply-side connection state determination step includes a second ink liquid level position storage step of storing the second ink liquid level position in a state where the supply tank is open to the atmosphere, a pressurization step of pressurizing an inside of the supply tank after the second ink liquid level position storage step; and a second ink liquid level position checking step of checking, after the pressurization step, the second ink liquid level position in a state where the supply tank is open to the atmosphere, and in the supply-side connection state determination step, when the second ink liquid level position checked in the second ink liquid level position checking step is lower than the second ink liquid level position stored in the second ink liquid level position storage step, it is determined that the connection between the ink inflow pipe and the supply branch pipe via the second connector is properly made.

7. The head replacement method according to claim 6, wherein, the ink supply mechanism includes a second liquid level sensor configured to detect the second ink liquid level position, and the connection state determination step includes an ink liquid level position rechecking step of continuously checking the second ink liquid level position in a state where the ink is circulated in the circulation flow path to cause the ink to be supplied only to a non-replacement target head being a head that is not replaced among the plurality of heads, unless the second ink liquid level position checked in the second ink liquid level position checking step is lower than the second ink liquid level position stored in the second ink liquid level position storage step, and in the connection state determination step, when there is a change in the second ink liquid level position checked in the ink liquid level position rechecking step, it is determined that there is an abnormality in the connection between the ink inflow pipe and the supply branch pipe via the second connector, and when there is no change in the second ink liquid level position checked in the ink liquid level position rechecking step, it is determined that there is an abnormality in the second liquid level sensor.

8. The head replacement method according to claim 1, further comprising an ink liquid level position pre-checking step of continuously checking the ink liquid level position in a state where the ink is circulated in the circulation flow path to cause the ink to be supplied only to the replacement target head among the plurality of heads before the pipe removal step and the head removal step, wherein the pipe removal step, the head removal step, the head attachment step, the pipe connection step, the ink circulation start step, and the connection state determination step are performed only when there is a change in the ink liquid level position checked in the ink liquid level position pre-checking step.

9. The head replacement method according to claim 8, wherein the ink supply mechanism includes a liquid level sensor that detects the ink liquid level position, a supply control valve that controls a flow of ink in the supply branch pipe, and a collection control valve that controls a flow of ink in the collection branch pipe, the head replacement method further comprises a liquid level sensor inspection step of continuously checking the ink liquid level position in a state where the ink is circulated in the circulation flow path to cause the ink to be supplied only to a non-replacement target head being a head that is not replaced among the plurality of heads, when there is no change in the ink liquid level position checked in the ink liquid level position pre-checking step, and when there is a change in the ink liquid level position checked in the liquid level sensor inspection step, it is determined that there is an abnormality in the supply control valve corresponding to the replacement target head or the collection control valve corresponding to the replacement target head, and when there is no change in the ink liquid level position checked in the liquid level sensor inspection step, it is determined that there is an abnormality in the liquid level sensor.

10. The head replacement method according to claim 9, wherein the ink supply mechanism includes, each as the liquid level sensor, a first liquid level sensor configured to detect a first ink liquid level position representing a height of an ink liquid level in the collection tank, and a second liquid level sensor configured to detect a second ink liquid level position representing a height of an ink liquid level in the supplying tank, in the ink liquid level position pre-checking step and the liquid level sensor inspection step, the first ink liquid level position and the second ink liquid level position are checked each as the ink liquid level position, when there is no change in the first ink liquid level position checked in the ink liquid level position pre-checking step and there is a change in the first ink liquid level position checked in the liquid level sensor inspection step, it is determined that there is an abnormality in the collection control valve corresponding to the replacement target head, when there is no change in the first ink liquid level position checked in the ink liquid level position pre-checking step and there is no change in the first ink liquid level position checked in the liquid level sensor inspection step, it is determined that there is an abnormality in the first liquid level sensor, when there is no change in the second ink liquid level position checked in the ink liquid level position pre-checking step and there is a change in the second ink liquid level position checked in the liquid level sensor inspection step, it is determined that there is an abnormality in the supply control valve corresponding to the replacement target head, and when there is no change in the second ink liquid level position checked in the ink liquid level position pre-checking step and there is no change in the second ink liquid level position checked in the liquid level sensor inspection step, it is determined that there is an abnormality in the second liquid level sensor.

11. The head replacement method according to claim 1, wherein the ink supply mechanism includes a first liquid level sensor configured to detect a first ink liquid level position representing a height of an ink liquid level in the collection tank and a second liquid level sensor configured to detect a second ink liquid level position representing a height of an ink liquid level in the supply tank, and in the connection state determination step, it is determined whether the pipe connection is properly made based on at least one of the first ink liquid level position detected by the first liquid level sensor and the second ink liquid level position detected by the second liquid level sensor.

12. The head replacement method according to claim 1, wherein the inkjet printing apparatus includes a controller configured to control operations of the plurality of heads and the ink supply mechanism, the pipe removal step, the head removal step, the head attachment step, and the pipe connection step are performed by an operator, and the ink circulation start step and the connection state determination step are performed by the controller.

13. The head replacement method according to claim 12, wherein the controller includes a display unit, and in the connection state determination step, a determination result as to whether the pipe connection is properly made is displayed on the display unit.

14. An inkjet printing apparatus comprising:

a plurality of heads each configured to eject ink toward a printing medium;

an ink supply mechanism configured to supply ink to each of the plurality of heads; and a controller configured to control operations of the plurality of heads and the ink supply mechanism, wherein the ink supply mechanism includes a supply tank configured to store ink to be supplied to each of the plurality of heads, a collection tank configured to store ink collected from each of the plurality of heads, a supply pipe forming a flow path for ink supplied from the supply tank to each of the plurality of heads, a collection pipe forming a flow path for ink collected from each of the plurality of heads to the collection tank, a recirculation pipe configured to recirculate ink from the collection tank to the supply tank, a supply branch pipe forming a flow path for ink flowing from the supply pipe to each of the plurality of heads, and a collection branch pipe forming a flow path for ink flowing from each of the plurality of heads to the collection pipe, each of the plurality of heads includes an ink discharge pipe, a first connector for connecting the ink discharge pipe and the collection branch pipe;

an ink inflow pipe, and a second connector for connecting the ink inflow pipe and the supply branch pipe, the supply tank, the supply pipe, the supply branch pipe, the ink inflow pipe, the ink discharge pipe, the collection branch pipe, the collection pipe, the collection tank, and the recirculation pipe form a circulation flow path through which ink circulates, and the controller execute, in order stated below, a message output step of outputting a message prompting replacement of a head, a replacement completion reception step of receiving an input indicating that the replacement of the head is completed, an ink circulation start step of starting circulation of ink in the circulation flow path to cause ink to be supplied to a new head that is a head after replacement, and a connection state determination step of determining, based on an ink liquid level position representing a height of an ink liquid level in at least one of the collection tank and the supply tank, whether a pipe connection, including a connection between the ink discharge pipe included in the new head and the collection branch pipe via the first connector and a connection between the ink inflow pipe included in the new head and the supply branch pipe via the second connector, is properly made.

15. A non-transitory computer-readable recording medium on which a head replacement support program is recorded, the head replacement support program causing a computer included in a controller to execute, in an inkjet printing apparatus including a plurality of heads each configured to eject ink toward a printing medium, an ink supply mechanism configured to supply ink to each of the plurality of heads, and the controller configured to control operations of the plurality of heads and the ink supply mechanism:

a message output step of outputting a message prompting replacement of a head;

a replacement completion reception step of receiving an input indicating that the replacement of the head is completed; and a replacement work result inspection step of inspecting whether replacement of the head is properly made, wherein the ink supply mechanism includes a supply tank configured to store ink to be supplied to each of the plurality of heads, a collection tank configured to store ink collected from each of the plurality of heads, a supply pipe forming a flow path for ink supplied from the supply tank to each of the plurality of heads, a collection pipe forming a flow path for ink collected from each of the plurality of heads to the collection tank, a recirculation pipe configured to recirculate ink from the collection tank to the supply tank, a supply branch pipe forming a flow path for ink flowing from the supply pipe to each of the plurality of heads, and a collection branch pipe forming a flow path for ink flowing from each of the plurality of heads to the collection pipe, each of the plurality of heads includes an ink discharge pipe, a first connector for connecting the ink discharge pipe and the collection branch pipe;

an ink inflow pipe, and a second connector for connecting the ink inflow pipe and the supply branch pipe, the supply tank, the supply pipe, the supply branch pipe, the ink inflow pipe, the ink discharge pipe, the collection branch pipe, the collection pipe, the collection tank, and the recirculation pipe form a circulation flow path through which ink circulates, and the replacement work result inspection step includes an ink circulation start step of starting circulation of ink in the circulation flow path to cause ink to be supplied to a new head that is a head after replacement, and a connection state determination step of determining, based on an ink liquid level position representing a height of an ink liquid level in at least one of the collection tank and the supply tank, whether a pipe connection, including a connection between the ink discharge pipe included in the new head and the collection branch pipe via the first connector and a connection between the ink inflow pipe included in the new head and the supply branch pipe via the second connector, is properly made.

* * * * *